United States Patent [19]
Hiroya et al.

[11] Patent Number: 5,754,654
[45] Date of Patent: May 19, 1998

[54] ELECTRONIC TICKET VENDING SYSTEM AND METHOD THEREOF

[75] Inventors: Masaaki Hiroya, Yokohama; Hiroshi Asao, Kawasaki, both of Japan

[73] Assignee: Hitachi, Ltd., Tokyo, Japan

[21] Appl. No.: 558,741

[22] Filed: Nov. 16, 1995

[30] Foreign Application Priority Data

Nov. 18, 1994 [JP] Japan .................. 6-284623

[51] Int. Cl.$^6$ .................................................. H04L 9/00
[52] U.S. Cl. .................................... 380/24; 380/23
[58] Field of Search .............................. 380/16, 24, 23, 380/30

[56] References Cited

U.S. PATENT DOCUMENTS 4,663,664  5/1987  Ragan et al. ................. 380/16
5,557,518  9/1996  Rosen ........................... 380/24
5,621,797  4/1997  Rosen ........................... 380/24

Primary Examiner—Salvatore Cangialosi
Attorney, Agent, or Firm—Fay Sharpe Beall Fagan Minnich & McKee

[57] ABSTRACT

A system comprises an electronic ticket vending and refunding device retained by a ticket publisher, a terminal device having a data input device, a data display device, and a data transmission and reception device, etc. which are operated by a purchaser, and en electronic ticket storage device retained by the purchaser, and the vending and refunding device and the terminal device are connected by a communication line such as a telephone line, and the storage device and the terminal device can be connected in contact or non-contact, and transmission and reception of data between the vending and refunding device and the storage device are executed by electronic money and an electronic ticket which are electronically signed, and a trouble of sending and receiving of an electronic ticket and electronic money is prevented by recording the transaction history as required.

18 Claims, 12 Drawing Sheets

FIG. 7

| TRANSACTION # | OBJECT | SENT/RECEIVED | CONTENT | DELETABLE FLAG (650) |
|---|---|---|---|---|
| : | : | : | : | : |
| 3 4 5 1 2 2 | MONEY | RECEIVED | ¥ 2,8 0 0 | O F F |
| 3 4 5 1 2 2 | TICKET | SENT | 6/5 : RESERVED SEAT B 21-12 | O F F |
| 3 4 5 1 2 3 | MONEY | RECEIVED | ¥ 7,4 0 0 | O F F |
| 3 4 5 1 2 3 | TICKET | SENT | 6/2 : RESERVED SEAT A 2-56<br>6/2 : RESERVED SEAT A 2-57 | O F F |
| : | : | : | : | : |

FIG. 8

| ID OF THE OPPOSITE OF COMMUNICATION | OBJECT | SENT/RECEIVED | CONTENT | DELETABLE FLAG (630) |
|---|---|---|---|---|
| PRO BASEBALL TEAM A | MONEY | SENT | ¥ 7,4 0 0 | O F F |
| PRO BASEBALL TEAM A | TICKET | RECEIVED | # 1 | O F F |

FIG. 9

| PUBLISHER'S NAME | TRANSACTION # | TICKET NAME | NUMBER OF TICKETS | DATE 1 | SEAT 1 | ... | DATE m | SEAT m (610) |
|---|---|---|---|---|---|---|---|---|

FIG. 10

| TICKET # | TICKET DATA | DIGITAL SIGNATURE | INVALID FLAG |
|---|---|---|---|
| 1 | TICKET DATA 1 | SIGNATURE 1 | INVALID FLAG 1 |
| ⋮ | ⋮ | ⋮ | ⋮ |
| m | TICKET DATA m | SIGNATURE m | INVALID FLAG m |

| TICKET # | ENCRYPED TICKET DATA | PUBLIC KEY | INVALID FLAG |
|---|---|---|---|
| 1 | ENCRYPED TICKET DATA 1 | PUBLIC KEY 1 | INVALID FLAG 1 |
| ⋮ | ⋮ | ⋮ | ⋮ |
| m | ENCRYPED TICKET DATA m | PUBLIC KEY m | INVALID FLAG m |

| TRANSACTION # | OBJECT | SENT/RECEIVED | CONTENT | DELETABLE FLAG |
|---|---|---|---|---|
| : | : | : | : | : |
| 3 4 5 1 2 2 | MONEY | RECEIVED | ¥ 2,8 0 0 | O F F |
| 3 4 5 1 2 2 | TICKET | SENT | 6/5 : RESERVED SEAT B 21-12 | O F F |
| 3 4 5 1 2 3 | MONEY | RECEIVED | ¥ 7,4 0 0 | O N |
| 3 4 5 1 2 3 | TICKET | SENT | 6/2 : RESERVED SEAT A 2-56<br>6/2 : RESERVED SEAT A 2-57 | O N |
| : | : | : | : | : |
| 3 6 7 0 0 1 | TICKET | RECEIVED | 6/2 : RESERVED SEAT A 2-56<br>6/2 : RESERVED SEAT A 2-57 | O N |
| 3 6 7 0 0 1 | MONEY | SENT | ¥ 7,4 0 0 | O N |

| ID OF THE OPPOSITE OF COMMUNICATION | OBJECT | SENT/RECEIVED | CONTENT | DELETABLE FLAG |
|---|---|---|---|---|
| PRO BASEBALL TEAM A | MONEY | SENT | ¥ 7,4 0 0 | O N |
| PRO BASEBALL TEAM A | TICKET | RECEIVED | # 1 | O N |
| : | : | : | : | : |
| PRO BASEBALL TEAM A | TICKET | SENT | # 1 | O N |
| PRO BASEBALL TEAM A | MONEY | RECEIVED | ¥ 7,4 0 0 | O N |

1380

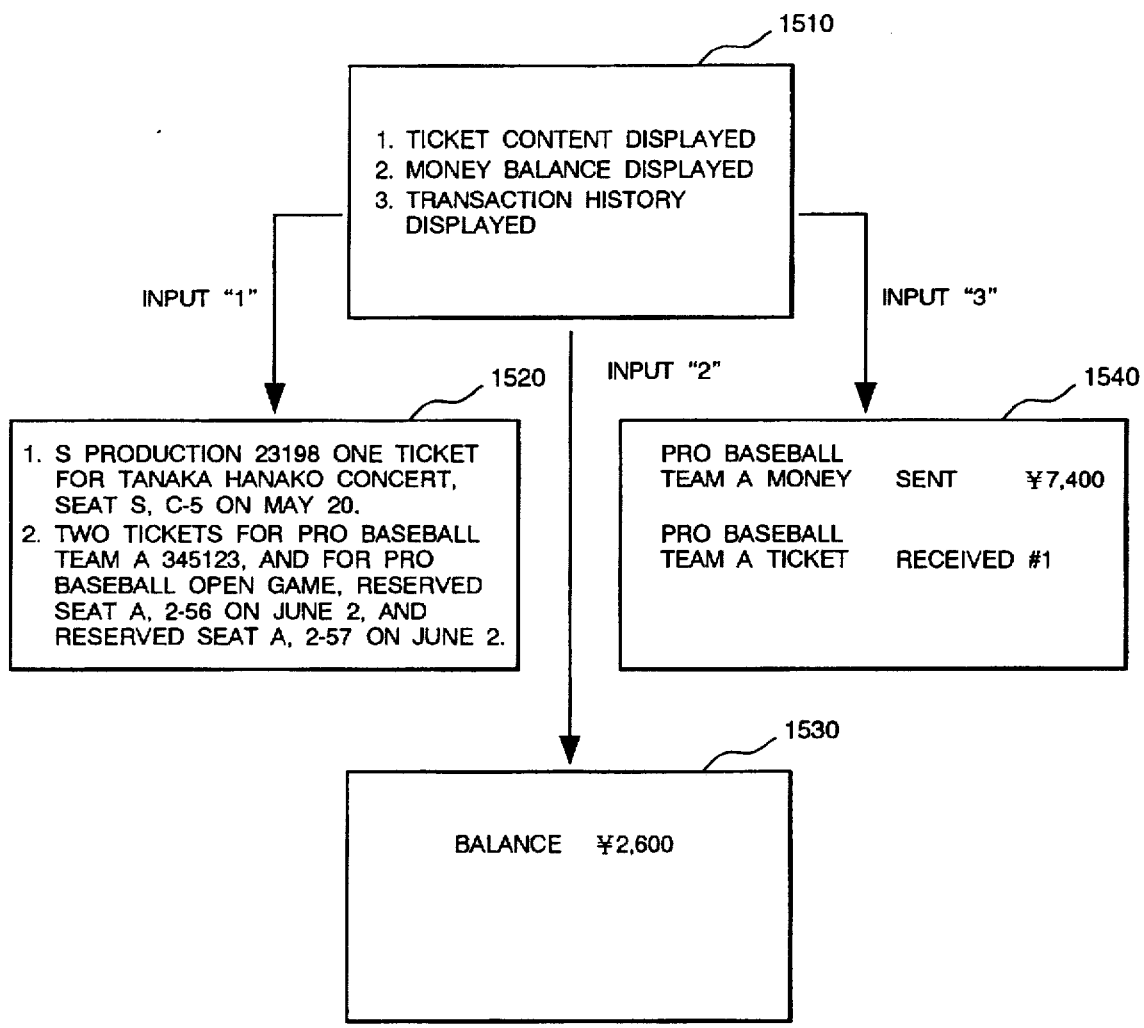

ELECTRONIC TICKET VENDING SYSTEM AND METHOD THEREOF

BACKGROUND OF THE INVENTION

1. FIELD OF THE INVENTION

The present invention relates to an electronic ticket vending system or an electronic ticket vending/refunding system and a method thereof using electronic information (hereinafter called electronic money or electronic cash) having the value of money for purchasing commodities, receiving services, or cashing a check or electronic information (electronic ticket) on train tickets or concert admission tickets which are generally called tickets.

2. DESCRIPTION OF THE PRIOR ART

Conventionally, to purchase a train ticket or a concert ticket, it is generally necessary to go to a counter for vending tickets. The reason is that a ticket is a printed paper and it is necessary to pay the cost of the ticket. Some ticket may be purchased by telephone, though it is necessary to mail the ticket. In this case, a credit card, bank transfer, mail transfer, or cash registration is used so as to pay the cost of the ticket. However, in the case of bank transfer, mail transfer, or cash registration, it is necessary to go to a bank or a post office.

Recently, as a new settling means, for example, there is a method using electronic data (hereinafter referred to as electronic money) having the value of money which is disclosed in Published Unexamined Patent Application (Based on International Application) 5-504643. In this conventional example, a means for storing electronic money (hereinafter called an electronic purse), a means for transferring electronic money between a host computer of a bank and an electronic purse, a means for transferring electronic money between two electronic purses, and a means for preventing forgery or illegal reproduction of electronic money are described. In this example, as a means for preventing forgery and illegal reproduction of electronic money, an asymmetric encryption algorithm represented by the RSA (Rivest Shamier Adleman) algorithm and a symmetric encryption algorithm represented by the DES (Data Encryption Standard) are used.

By using an electronic money system having these encryption arts, electronic money can be transferred safely between two electronic purses connected by a telephone line. The encryption arts used in this conventional example can be applied also to transfer of electronic ticket information by a public line such as telephone. Namely, when an electronic ticket having electronic ticket information printed on a paper, the aforementioned electronic money as a means for paying the ticket cost, and a physical storage medium such as an IC card storing them are used, by using a communication means such as telephone, a ticket can be purchased without going to a ticket vending window, a bank, or a post office. In the same way, refunding of the ticket cost due to cancel of the ticket can be executed by using a communication means such as telephone.

An electronic ticket storing just electronic ticket information may be easily forged or reproduced illegally. By using encryption by an asymmetric algorithm equivalent to the means for preventing forgery and illegal reproduction of electronic money which is used in the method disclosed in Published Unexamined Patent Application 5-504643 mentioned above, illegality can be prevented to a certain extent.

In the encryption method in the aforementioned conventional example, when electronic money is sent between electronic purses storing electronic money, by using the only common global secret key in one electronic money system as a means for judging whether the opposite of communication belongs to the same electronic money system as that of oneself or not, a local secret key used by each electronic purse when money is sent between electronic purses is signed electronically. All electronic purses belonging to the aforementioned electronic purse system have a global public key corresponding to the aforementioned global secret key, so that by using the global public key, the encryption method can judge whether the opposite of communication belongs to the same electronic money system as that of oneself or not. There is a so-called prepaid card for purchasing by prepaying the cost as electronic money. A prepaid card does not have a function for using for anything like money, and objects to be purchased (commodities or services) are decided, and information to be stored is just data of frequency equivalent to the selling price. Particularly, since a prepaid card cannot cancel or refund a purchased object, it is different from electronic money which functions like money.

However, if it is attempted to apply an electronic money system having the aforementioned encryption art of the prior art to an electronic ticket vending and purchasing system using a public line such as telephone, there is only one kind of common global secret key and it is not signed electronically on the electronic money itself, so that the problems described hereunder are imposed.

When a plurality of ticket publication sources (for example, a railroad corporation, airplane company, event promoter, etc.) share the same electronic ticket system, in other words, when electronic tickets published by different ticket publishers are stored and used in one kind of electronic ticket storage device at the same time or one after another, a ticket publisher may forge or reproduce illegally a ticket published by another ticket publisher by using the I/O interface, command interface, or encryption mechanism of the electronic ticket storage device. Therefore, when the same electronic ticket storage device is shared, a means for preventing forgery and illegal reproduction of a ticket by another ticket publisher is necessary. There is an IC card (also called a smart card) as a typical example of the electronic ticket storage device.

Furthermore, when ticket information stored in the electronic ticket storage device is encrypted, to confirm the ticket information stored in the electronic ticket storage device by a ticket purchaser, a terminal device having a decryption means is necessary. However, in consideration of convenience, it is desirable that a portable terminal device on the market can be used.

When cash or a ticket is given or received by telephone, a ticket purchaser and a ticket vender are located away from each other, so that a trouble may be caused that cash or a ticket is stolen off or cash or a ticket is not given or received actually. For example, when a ticket purchaser makes a claim for that he receives no ticket after he purchases a ticket and pays electronic money as a cost of the ticket, the ticket purchaser may tell the truth or make a false statement. Even when a ticket purchaser makes a claim for that no electronic money is sent to him after he transfers his ticket to the ticket vender so as to refund the ticket, the same is caused.

Furthermore, it is assumed that to refund the ticket cost, a ticket purchaser sends an electronic ticket to a ticket vender first and the ticket vender checks the validity of the ticket and then sends the ticket cost to the ticket purchaser by electronic money. When an electronic ticket is to be sent, if a copy of the electronic ticket is sent to the ticket vender without deleting the electronic ticket and the electronic ticket storage device (IC card) is pulled out forcibly from the terminal device at the same time that the ticket cost is sent from the ticket vender, a problem arises that the valid ticket and the refunding cost of the ticket exist on the ticket purchaser side at the same time. On the other hand, when an electronic ticket is deleted from the electronic ticket storage device so as to send the electronic ticket, if a communication failure occurs before the ticket refund reaches the ticket purchaser after the electronic ticket is sent, a status that the ticket purchaser loses the ticket and cannot receive the refund occurs. Since the ticket is deleted, even if the ticket purchaser attempts to make a claim for the ticket vender, a problem arises that there is no physical evidence.

SUMMARY OF THE INVENTION

An object of the present invention is to solve these problems and to provide an electronic ticket vending and refunding system and a method thereof for working when a plurality of ticket venders share only one electronic ticket vending and refunding system in a system for purchasing or refunding a ticket from a distant place using a telephone line for preventing forgery or illegal reproduction of an electronic ticket by a ticket purchaser and allowing a ticket purchaser to confirm the content of an electronic ticket even by a terminal device having no means for decrypting ticket information stored in the electronic ticket storage device.

Another object of the present invention is to provide an electronic ticket vending and refunding system and a vending and refunding method thereof for working when a transaction using electronic money and an electronic ticket is executed via a telephone line for preventing a trouble on whether the electronic money and the electronic ticket are given or received actually.

Still another object of the present invention is to provide an electronic ticket vending and refunding system and a vending and refunding method thereof for preventing a ticket purchaser from retaining both a valid ticket and a refund at the same time so as to refund the ticket cost and proving that the ticket purchaser retains the ticket when he cannot receive the refund.

To accomplish these objects, the electronic ticket vending system or vending and refunding system and the method thereof of the present invention comprise a vending device for generating an electronic ticket and executing at least one of vending and refunding by exchanging the generated electronic ticket with electronic money and a communication line connected to it and furthermore comprise at least one terminal device connected to the aforementioned communication line for executing input, output, and transmission and reception so as to execute at least one of vending and refunding of an electronic ticket and an electronic ticket storage device having a function for electronically connecting the aforementioned terminal device for storing electronic money and a purchased electronic ticket, wherein by a request of at least one of purchasing and refunding of an electronic ticket by at least one of the aforementioned terminal device and electronic ticket storage device, at least one of the electronic ticket and the electronic money is sent from the aforementioned electronic ticket vending device via the aforementioned communication line.

More concretely, the electronic ticket vending and refunding system of the present invention is a ticket vending and refunding system using electronic money and an electronic ticket and comprises an electronic ticket vending and refunding device for producing an electronic ticket and vending or refunding the produced electronic ticket by electronic money, a terminal device for executing at least input, display, and transmission and reception of electronic ticket vending and refunding data, and an electronic ticket storage device for storing an electronic ticket purchased by electronic money, wherein the aforementioned electronic ticket vending and refunding device is connected to the aforementioned terminal device by a communication line such as a telephone line and the aforementioned electronic ticket storage device is connected to the terminal device in contact or non-contact.

In the aforementioned electronic ticket vending and refunding system, it is desirable that the aforementioned electronic ticket vending and refunding device comprises at least a ticket production means for producing a ticket, a ticket transmission and reception means for transmitting or receiving an electronic ticket, a money transmission and reception means for transmitting or receiving electronic money, a money storage means for storing electronic money, a transaction history storage means for storing a transaction history, and an encryption key storage means for storing an encryption key.

It is desirable that the aforementioned ticket production means comprises at least a microcomputer for producing an electronic ticket from data indicating a ticket publication source and data indicating the price of a ticket.

To prevent another ticket publisher from publishing a ticket which is forged or illegally reproduced even if a plurality of ticket publishers share a single electronic ticket system, the aforementioned electronic ticket vending and refunding device can allocate a different secret key of asymmetric encryption algorithm and a different public key which forms a counterpart to the secret key to each ticket publisher and store them in the aforementioned encryption key storage device.

Furthermore, it is desirable that the electronic ticket storage device comprises at least an electronic ticket storage means and an electronic money storage means for storing an electronic ticket and electronic money respectively, a transaction history storage means, an I/O interface with the outside, and a microprocessor which is set so as to control transmission and reception of an electronic ticket and electronic money and storage the history thereof.

Furthermore, it is desirable that to allow even a terminal device having no decryption mechanism to confirm the content of an electronic ticket stored in the electronic ticket storage device, the electronic ticket storage device comprises a means for storing unencrypted ticket data and a means for storing an electronic signature which is produced by encrypting the whole or a part of the aforementioned ticket data by the secret key of the asymmetric algorithm and the microprocessor can operate so as to return the aforementioned unencrypted ticket information to a first command obtained via the aforementioned physical interface with the outside as a response to the first command and to check the validity of a second command for the second command and return the aforementioned ticket information and aforementioned electronic signature as a response to the second command when it judges that the second command is valid.

As an alternative means therefor, it is possible that the aforementioned electronic ticket storage means comprises a means for storing ticket information which is encrypted by the secret key of the asymmetric encryption algorithm and a means for storing a public key which forms a counterpart to the secret key which encrypts the ticket information and the microprocessor is set so as to return the result which is obtained by decrypting the aforementioned encrypted ticket information by the public key to a first command obtained via the aforementioned physical interface with the outside as a response to the first command and to check the validity of a second command for the second command and return the aforementioned encrypted ticket information as a response to the second command when it judges that the second command is valid.

Furthermore, as a means for judging the validity of an electronic ticket, it is possible that the aforementioned microprocessor of the electronic ticket storage device is set so as to return a response to a third command and an electronic signature obtained via the physical interface with the outside on whether there exists an electronic signature conforming to the aforementioned electronic signature in the electronic ticket storage means.

To prevent an I/O history of an electronic ticket and electronic money from alteration, it is desirable that the aforementioned microprocessor of the electronic ticket storage device is set so that an item relating to the aforementioned electronic ticket cannot be deleted from the transaction history storage means until the electronic ticket stored in the electronic ticket storage means is deleted.

Furthermore, to prevent both the ticket to be refunded and the refund from existing in the electronic ticket storage device at the same time by pulling out the electronic ticket storage device forcibly from the terminal device for refunding, it is possible that the aforementioned microprocessor of the electronic ticket storage device is set so as to delete the electronic ticket to be refunded which is stored in the electronic ticket storage area of the electronic ticket storage means when electronic money is stored in the aforementioned electronic money storage means so as to refund the ticket.

As an alternative means therefor, it is possible that the aforementioned electronic ticket storage means of the electronic ticket storage device has an area for storing an invalid flag and the aforementioned microprocessor of the electronic ticket storage device makes the aforementioned invalid flag corresponding to the electronic ticket to be refunded valid for refunding of the ticket, and then transfers the electronic ticket to the electronic ticket vending and refunding device, and deletes the electronic ticket stored in the electronic ticket storage area of the electronic ticket storage means after completion of transfer.

The electronic ticket vending and refunding method of the present invention is an electronic ticket vending and refunding method for allowing ticket vending or refunding to a distant place using an electronic ticket, electronic money, and a communication line, wherein to vend an electronic ticket, when the electronic ticket vending and refunding device receives a ticket vending request from a terminal device via the communication line, the device sends the target ticket and a cost sending request therefor to the terminal device via the communication line, receives electron money of the target ticket cost from the electronic ticket storage device connected to the terminal device via the communication line, then produces an electronic ticket which is requested to vend, sends the electronic ticket to the terminal device via the communication terminal, vends the electronic ticket by transferring the electronic ticket to the electronic ticket storage device by the terminal device which receives the electronic ticket, and to refund the aforementioned purchased electronic ticket, when the electronic ticket vending and refunding device receives a refunding request from the terminal device via the communication line, the device requests sending of the electronic ticket which is requested to refund to the electronic ticket storage device connected to the terminal device, receives the electronic ticket from the electronic ticket storage device via the communication line, then confirms the validity of the electronic ticket, sends electronic money of the ticket refund to the terminal device via the communication line when it judges that the electronic ticket is valid, and refunds the electronic ticket by transferring the electronic money to the electronic ticket storage device from the terminal device which receives the electronic money.

Furthermore, it is desirable that when an electronic ticket is vended by the aforementioned electronic ticket vending and refunding method, the electronic ticket vending and refunding device executes a step of receiving electronic money from the electronic ticket storage device, a step of storing that the device receives the electronic money from the electronic ticket storage device, a step of sending the electronic ticket to the electronic ticket storage device, and a step of storing that the device sends the electronic ticket to the electronic ticket storage device. Furthermore, to refund the aforementioned purchased electronic ticket, it is possible that the electronic ticket vending and refunding device executes a step of receiving the electronic ticket from the electronic ticket storage device, a step of storing that the device receives the electronic ticket from the electronic ticket storage device, a step of sending the aforementioned electronic money to the electronic ticket storage device, and a step of storing that the device sends the electronic money to the electronic ticket storage device.

Furthermore, it is desirable that when an electronic ticket is vended by the aforementioned electronic ticket vending and refunding method, the electronic ticket storage device executes a step of sending electronic money to the electronic ticket vending and refunding device, a step of storing that the device sends the electronic money to the electronic ticket vending and refunding device, a step of receiving the electronic ticket from the electronic ticket vending and refunding device, and a step of storing that the device receives the electronic ticket from the electronic ticket vending and refunding device.

Furthermore, to refund the aforementioned purchased electronic ticket, it is desirable that the electronic ticket storage device executes a step of sending the electronic ticket to the electronic ticket vending and refunding device, a step of storing that the device sends the electronic ticket to the electronic ticket vending and refunding device, a step of receiving the electronic money from the electronic ticket vending and refunding device, and a step of storing that the device receives the electronic money from the electronic ticket vending and refunding device.

The present invention having the aforementioned constitution has the function and operation indicated below.

The operations of the electronic ticket vending and refunding system and the vending and refunding method thereof of the present invention will be explained hereunder for (1) a case of purchasing a ticket, (2) a case of confirming the content of a ticket, and (3) a case of refunding a ticket.

(1) Case of purchasing a ticket

When a ticket purchaser purchases a ticket, he operates a terminal device connected to a communication line such as a telephone line and calls out an electronic ticket vending and refunding device, that is, a computer of a ticket publisher (or a ticket vender). The electronic ticket vending and refunding device sends a menu of tickets which can be sold to the terminal device via the communication line. The terminal device receives the menu and displays it on the display means. When the ticket purchaser selects the ticket to be purchased using the input means of the terminal device and then inputs necessary conditions such as the number of tickets, these data are sent to the electronic ticket vending and refunding device via the communication line.

The electronic ticket vending and refunding device checks whether the ticket can be vended. When the ticket can be vended, the device calculates the ticket cost and sends a sending request command to the terminal device. According to this request, the terminal device instructs the ticket purchaser to insert the electronic ticket storage device into the terminal device. In this case, a contact or non-contact type IC card may be used for the electronic ticket storage device. When a non-contact type IC card is used, electromagnetic waves such as infrared light or radio waves or ultrasonic waves are used for communication, so that there is no need to insert the IC card into the terminal device and it is desirable to bring the IC card close to the terminal device. When the ticket purchaser inputs a sending permission response from the input means of the terminal device, the response is sent to the electronic ticket vending and refunding device from the terminal device. The electronic ticket vending and refunding device receiving the response sends a sending command to the electronic ticket storage device via the terminal device. To prevent forgery or illegal reproduction of electronic money due to interception of the communication content of the electronic money, it is possible to use the sending procedure using the encryption art described in Published Unexamined Patent Application 5-504643 of the prior art. When the electronic ticket storage device sends the electronic money and then receives confirmation of reception of the electronic money from the electronic ticket vending and refunding device, the electronic ticket storage device records the ID of the opposite of sending (identifier), sent money, and completion of sending in the I/O history of electronic tickets and electronic money, that is, the transaction history.

Next, when the electronic ticket storage device sends completion of recording and the electronic ticket vending and refunding device receives it, the electronic ticket vending and refunding device produces an electronic ticket and then sends the electronic ticket to the terminal device. In this case, the electronic ticket includes ticket information such as the ticket name, publication source, date, and transaction sequence number and an electronic signature for proving the validity of the information. An electronic signature is data in which the whole or a part of ticket information is encrypted by using the secret key of an asymmetric encryption algorithm which is allocated to each ticket publisher beforehand. As a method for extracting a part of data from the aforementioned ticket information, there is a method using the hash function. As an alternative idea, a method for constituting an electronic ticket only by data in which the whole of the ticket information is encrypted by the aforementioned secret key may be used.

The constitution of the electronic ticket storage means of the electronic ticket storage device varies with the data structure of an electronic ticket. One is a constitution having an area for storing unencrypted ticket information and an area for storing an electronic signature and the other is a constitution having an area for storing ticket information in which all the statements are encrypted and an area for storing a public key which forms a counterpart to the secret key which encrypts the aforementioned ticket information.

In the former case, the electronic ticket vending and refunding device sends the unencrypted ticket information data and the electronic signature to the terminal device and in the latter case, it sends the ticket information data in which all the statements are encrypted and the public key which forms a counterpart to the secret key to the terminal device.

For an electronic ticket having one of the aforementioned data structures, the terminal device transfers the received data to the electronic ticket storage device and the electronic ticket storage device stores the received data in the electronic ticket storage means. When the data is stored in the electronic ticket storage means, the electronic ticket storage device records in the transaction history storage means that the electronic ticket is received.

Also as to transmission or reception of an electronic ticket, in the same way as transmission or reception of electronic money, by using the communication procedure described in Published Unexamined Patent Application 5504643 mentioned above, forgery or illegal reproduction of an electronic ticket due to interception of the communication content can be prevented.

(2) Case of confirming the content of a ticket

When a ticket purchaser confirms the content of the purchased ticket by the terminal device, he inputs a ticket data display command to the terminal device. When the terminal device receives the command, it sends a command for reading unencrypted data to the electronic ticket storage device via the communication line such as a telephone line. When the stored electronic ticket comprises unencrypted ticket data information and an electronic signature, the electronic ticket storage device returns only unencrypted data to the terminal device for this reading command and when the stored electronic ticket comprises data in which all the statements are encrypted and a public key, the electronic ticket storage device returns the result which is obtained by decrypting the ticket data in which all the statements are encrypted by the public key to the terminal device. The terminal device displays the received unencrypted ticket information data on the display unit of the terminal device.

As mentioned above, the terminal device basically provides an interface between a ticket purchaser, the electronic ticket storage device, and the electronic ticket vending and refunding device connected via the communication line. The encryption process for an electronic ticket and electronic money which is executed for communication with the electronic ticket vending and refunding device can prevent forgery and illegal reproduction of an electronic ticket and electronic money and alteration of a transaction history by concealing the encryption process by allowing the electronic ticket storage device to execute it. As a result, the transaction history can increase the proving ability for transfer of an electronic ticket and electronic money.

(3) Case of refunding a ticket

Next, to refund the purchased ticket, the ticket purchaser calls out the electronic ticket vending and refunding device from which the ticket is purchased by the terminal device via the communication line such as a telephone line and selects Ticket Refunding by the service kind selection menu. The terminal device reads and displays a list of electronic tickets stored in the electronic ticket storage device. When the ticket purchaser selects the ticket to be refunded, the terminal device sends the corresponding electronic ticket number to the electronic ticket vending and refunding device. The electronic ticket vending and refunding device sends a request command for sending the electronic ticket of the corresponding ticket number to the electronic ticket storage device via the terminal device. When the electronic ticket storage device receives reception confirmation of the corresponding electronic ticket from the electronic ticket vending and refunding device after it sends the corresponding electronic ticket to the electronic ticket vending and refunding device, the electronic ticket storage device records in the transaction history storage area of the electronic ticket storage device that it sends the ID of the opposite of sending and the aforementioned electronic ticket.

In this case, if an area for storing an invalid flag is provided in the electronic ticket storage area, the flag is turned ON and the corresponding ticket is made invalid. The reason is that if the data of an electronic ticket to be sent is deleted, and a communication failure occurs, and hence a ticket purchaser cannot receive the refund, the evidence indicating the content of the stored electronic ticket is prevented from missing and if a valid ticket is left as it is, a status that the electronic ticket storage device is disconnected forcibly from the terminal device at the same time that the ticket purchaser receives the electronic money and both the valid ticket and the refund are retained is prevented from occurrence. However, the aforementioned invalid flag may be used or may not be used. When an invalid flag is not used or is not provided, a saving area for ticket data and an electronic signature is provided in the electronic ticket storage means beforehand and the ticket data is made invalid by storing it in the saving area. Namely, it is desirable to store the ticket data with an electronic signature to be sent in the saving area immediately before starting sending of the electronic ticket, delete the aforementioned ticket data existing in the ticket storage area, and then send the ticket data.

On the other hand, the electronic ticket vending and refunding device receiving the electronic ticket records in the transaction history storage means of the electronic ticket vending and refunding device that it receives the electronic ticket. Next, the electronic ticket vending and refunding device confirms the validity of the sent electronic ticket using the public key which forms a counterpart to the secret key which electronically signs the ticket retained by the electronic ticket vending and refunding device. When the electronic ticket vending and refunding device judges that the electronic ticket is valid, it calculates the refund from the ticket cost and the ticket refunding commission and sends electronic money equal to the refund to the terminal device. If this occurs, the electronic ticket vending and refunding device records sending of the electronic money and the amount thereof in the transaction history storage means of the electronic ticket vending and refunding device.

When the electronic storage device receives the electronic money sent from the electronic ticket vending and refunding device via the terminal device, it accumulates the sent electronic money to the amount of money stored in the electronic ticket storage means and records reception of the electronic money and the amount thereof in the transaction history of the electronic ticket storage device and then deletes the electronic ticket to be refunded. If there is an area for storing an invalid flag in the electronic ticket storage area in this case, the electronic storage device turns the invalid flag OFF. Furthermore, the electronic ticket storage device puts the item in the I/O history relating to the deleted electronic ticket into the deletable state. As a method thereof, there is a method for providing a deletable flag for each item in the transaction history and turning the deletable flag ON when it becomes deletable. The invalid flag is turned OFF when the item in the transaction history corresponding to the deletable flag is deleted. By doing this, the transaction history cannot be deleted while an electronic ticket exists in the electronic ticket storage means, so that a trouble due to alteration of the transaction history can be prevented. When transaction histories are accumulated up to the storage capacity, it is desirable to delete deletable histories sequentially.

As a method for checking the validity of an electronic ticket other than a method, as mentioned above, for transferring an electronic ticket to the electronic ticket vending and refunding device from the electronic ticket storage device and checking the validity by the electronic ticket vending and refunding device, there is a method for sending unencrypted ticket information to the electronic ticket vending and refunding device from the electronic ticket storage device, producing an electronic signature from the ticket information sent from the electronic ticket vending and refunding device, sending the electronic signature to the electronic ticket storage device, and judging the validity by the electronic ticket storage device. To realize the method, it is desirable to provide a means for checking for the identity of the electronic signature sent to the electronic ticket storage device with the electronic signature retained by the electronic ticket storage device.

If a gate device having a public key which forms a counterpart to the secret key used to produce an electronic signature is installed in the entrance gate of an installation using tickets actually and the electronic ticket storage device is inserted into or located in the neighborhood of the gate device for use, paperless tickets can be used.

The foregoing and other objects, advantages, manner of operation and novel features of the present invention will be understood from the following detailed description when read in connection with the accompanying drawings.

BRIEF DESCRIPTION OF THE DRAWINGS

FIG. 7 is a data configuration diagram showing a content example of a transaction history file in the electronic ticket vending and refunding device shown in FIG. 2 when an electronic ticket is purchased.

FIG. 8 is a data configuration diagram showing a content example of a transaction history storage area in the electronic ticket storage device shown in FIG. 4 when an electronic ticket is purchased.

FIG. 9 is a data configuration diagram showing a content example of a ticket information file of the electronic ticket vending and refunding device shown in FIG. 2.

FIG. 10 is a data configuration diagram showing an example of the constitution of an electronic ticket storage area in the electronic ticket storage device shown in FIG. 4.

FIG. 11 is a data configuration diagram showing another example of the constitution of an electronic ticket storage area in the electronic ticket storage device shown in FIG. 4.

FIG. 14 is a data configuration diagram showing a content example of a transaction history file in the electronic ticket vending and refunding device shown in FIG. 2 when an electronic ticket is refunded.

FIG. 15 is a data configuration diagram showing a content example of a transaction history storage area in the electronic ticket storage device shown in Fig. 4 when an electronic ticket is refunded.

FIG. 17 is an illustration showing operation screen examples displayed when the information stored in the electronic ticket storage device shown in FIG. 4 is confirmed.

DETAILED DESCRIPTIONS OF THE PREFERRED EMBODIMENTS

An embodiment of the electronic ticket vending and refunding system and the vending and refunding method thereof of the present invention will be explained in detail hereunder by referring to the accompanying drawings.

Figure 1:
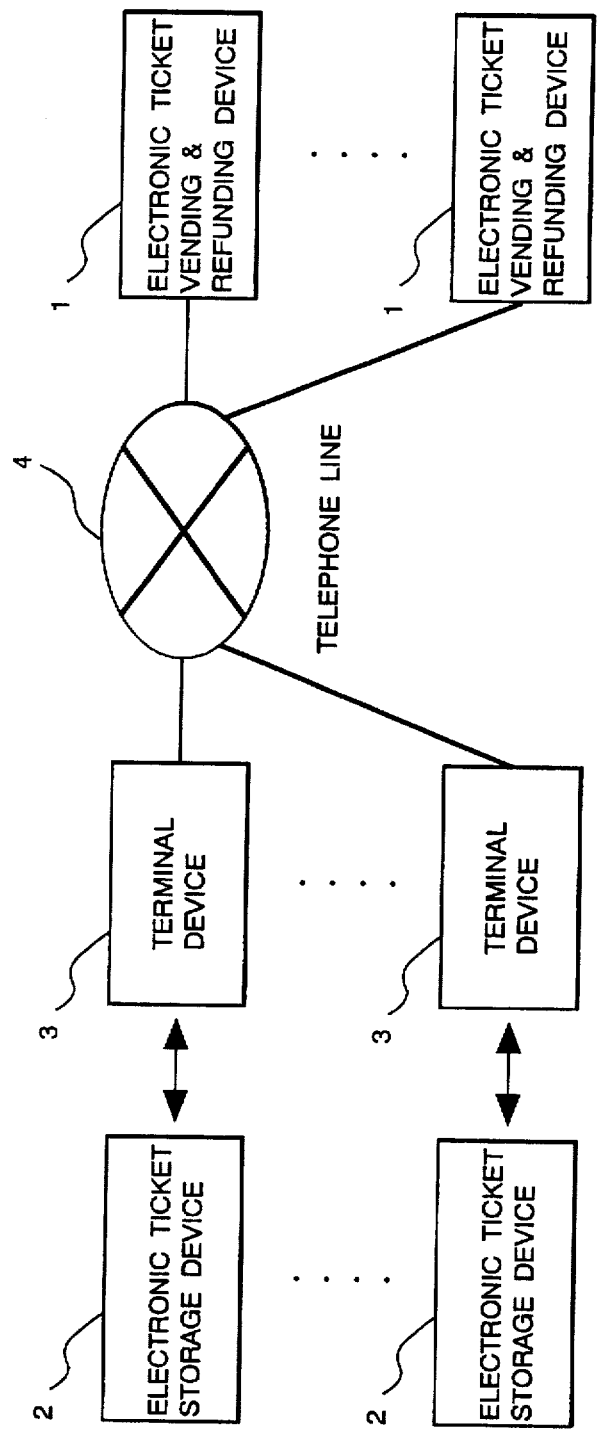
FIG. 1 is an overall block diagram showing an embodiment of the electronic ticket vending and refunding system of the present invention.

FIG. 1 is a block diagram showing the whole constitution of the electronic ticket vending and refunding system of the present invention. Reference code 1 indicates an electronic ticket vending and refunding device retained by a ticket publisher and a plurality of electronic ticket vending and refunding devices 1 are connected to a telephone line 4 respectively. A plurality of terminal devices 3 having a man-machine interface which are used and operated when a ticket purchaser purchases or refunds a ticket are connected to the telephone line 4. Electronic ticket storage devices 2 retained by ticket purchasers respectively are connected to the terminal devices 3 by physical interfaces (not shown in the drawing) in contact or non-contact so as to execute two-way communication.

As mentioned above, the electronic ticket vending and refunding system of the present invention is a system comprising a plurality of electronic ticket vending and refunding devices 1 connected to the telephone line 4, a plurality of terminal devices 3, and a plurality of electronic ticket storage devices 2 which can be connected to the terminal devices 3 in contact or non-contact. As a means for connecting each of the terminal devices 3 in non-contact, electromagnetic waves such as radio waves or infrared light or ultrasonic waves are used and as a means for realizing the electronic ticket storage devices 2, an IC card (also called a smart card) can be used.

The more detailed constitution of each of the devices 1 to 3 constituting the aforementioned electronic ticket vending and refunding system will be explained hereunder with reference to FIGS. 2 to 4.

Figure 2:
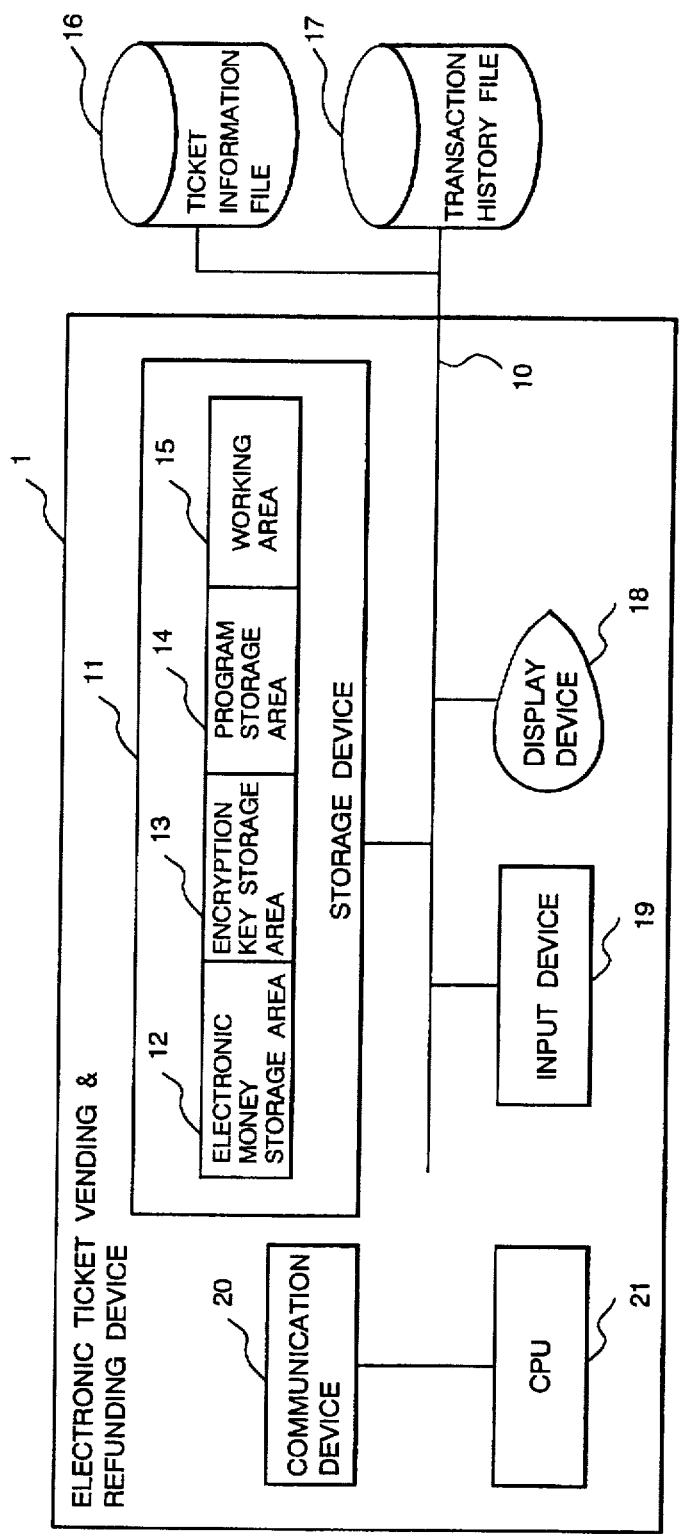
FIG. 2 is a block diagram showing the rough constitution of the electronic ticket vending and refunding device shown in FIG. 1.

Firstly, the constitution of the electronic ticket vending and refunding device 1 is shown in FIG. 2. The electronic ticket vending and refunding device 1 comprises a storage device 11, a display device 18 and an input device 19 which are used to confirm the vending condition of tickets and add new ticket information, a communication device 20 for communicating with the electronic ticket storage devices 2 using a communication line such as a telephone line, and a microprocessor (CPU) 21. Furthermore, to this electronic ticket vending and refunding device 1, a large capacity storage device (not shown in the drawing) such as a hardware disk which stores a ticket information file 16 for storing information on whether tickets can be vended and the ticket price and a transaction history file 17 for recording a history when electronic money and an electronic ticket are transmitted to or received from the electronic ticket storage devices 2 is connected via a bus line 10. When the electronic ticket vending and refunding device 1 has a built-in large capacity storage device, it is desirable to store the ticket information file 16 and the transaction history file 17 in it. As shown in FIG. 2, the storage device 11 comprises an electronic money storage area 12, an area 13 for storing an encryption key used to sign ticket information data electronically, an area 14 for storing a program, and a working area 15. The CPU 21 controls the aforementioned devices 11 to 20 constituting the electronic ticket vending and refunding device 1 according to the program stored in the program storage area of the storage device 11. The communication method of the communication device 20 may be wire communication or radio communication.

Figure 3:
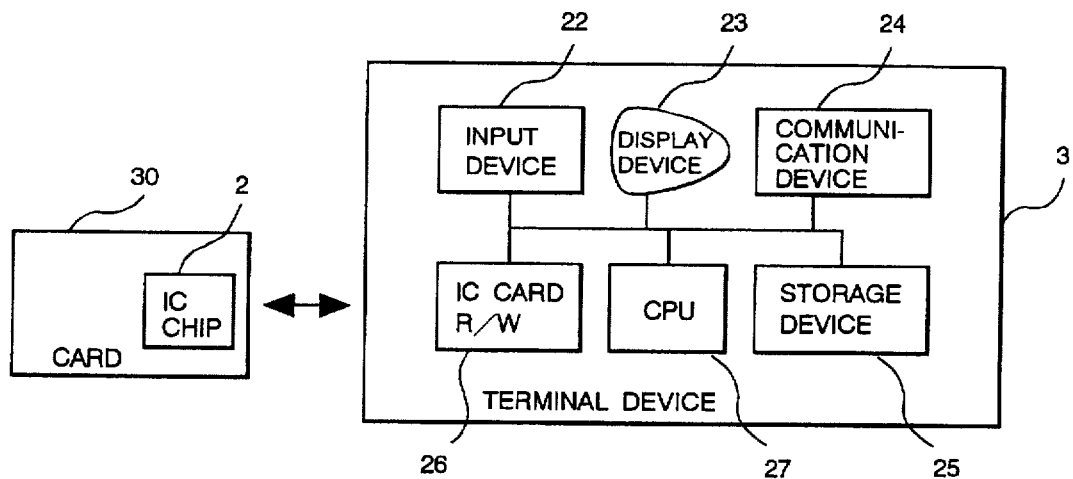
FIG. 3 is a block diagram showing en embodiment of the terminal device shown in FIG. 1.

Next, the constitution of the terminal device 3 is shown in FIG. 3. The terminal device 3 comprises an input device 22 for inputting data, a display device 23 for displaying data, a communication device 24 for communicating with the electronic ticket vending and refunding device 1 using a communication line such as a telephone line, a storage device 25, an IC card reader/writer (hereinafter abbreviated to IC card R/W) 26 for communicating with an IC card 30 comprising an electronic ticket storage device 2 formed on the IC chip, and a CPU 27 for controlling the aforementioned devices 22 to 26.

Figure 4:
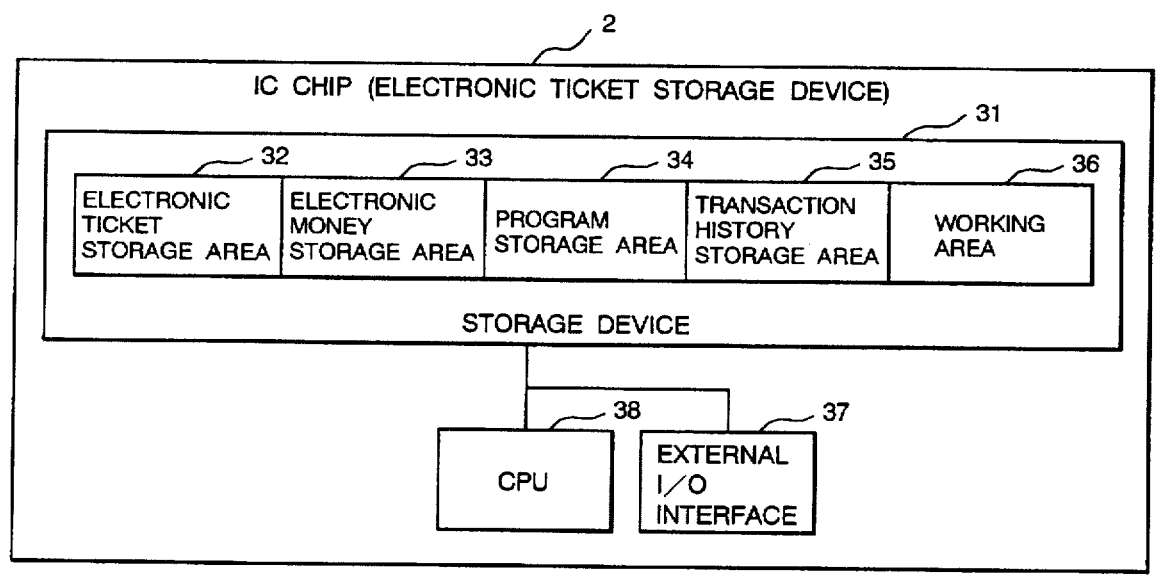
FIG. 4 is a schematic diagram showing the constitution of the electronic ticket storage device shown in FIG. 1.

FIG. 4 shows the constitution of the electronic ticket storage device 2. The electronic ticket storage device 2 formed on the IC chip comprises a storage unit 31 for storing data and a program, an external I/O interface 37 for connecting the IC card R/W 26 of the terminal device 3 physically, and a CPU 38 for processing in accordance with the program stored in the storage unit 31. Furthermore, the storage unit 31 comprises an electronic ticket storage area 32, an electronic money storage area 33, a program storage area 34, a transaction history storage area 35 for storing records of transmission and reception of an electronic ticket and electronic money, and a working area 36.

The vending and refunding method of the electronic ticket vending and refunding system of the present invention will be explained hereunder for (1) a case of purchasing a ticket newly, (2) a case of refunding a purchased ticket, and (3) a case of confirming the content of a purchased ticket by using the devices 1 to 3 having the aforementioned constitution.

(1) Case of purchasing a ticket newly

Figure 5:
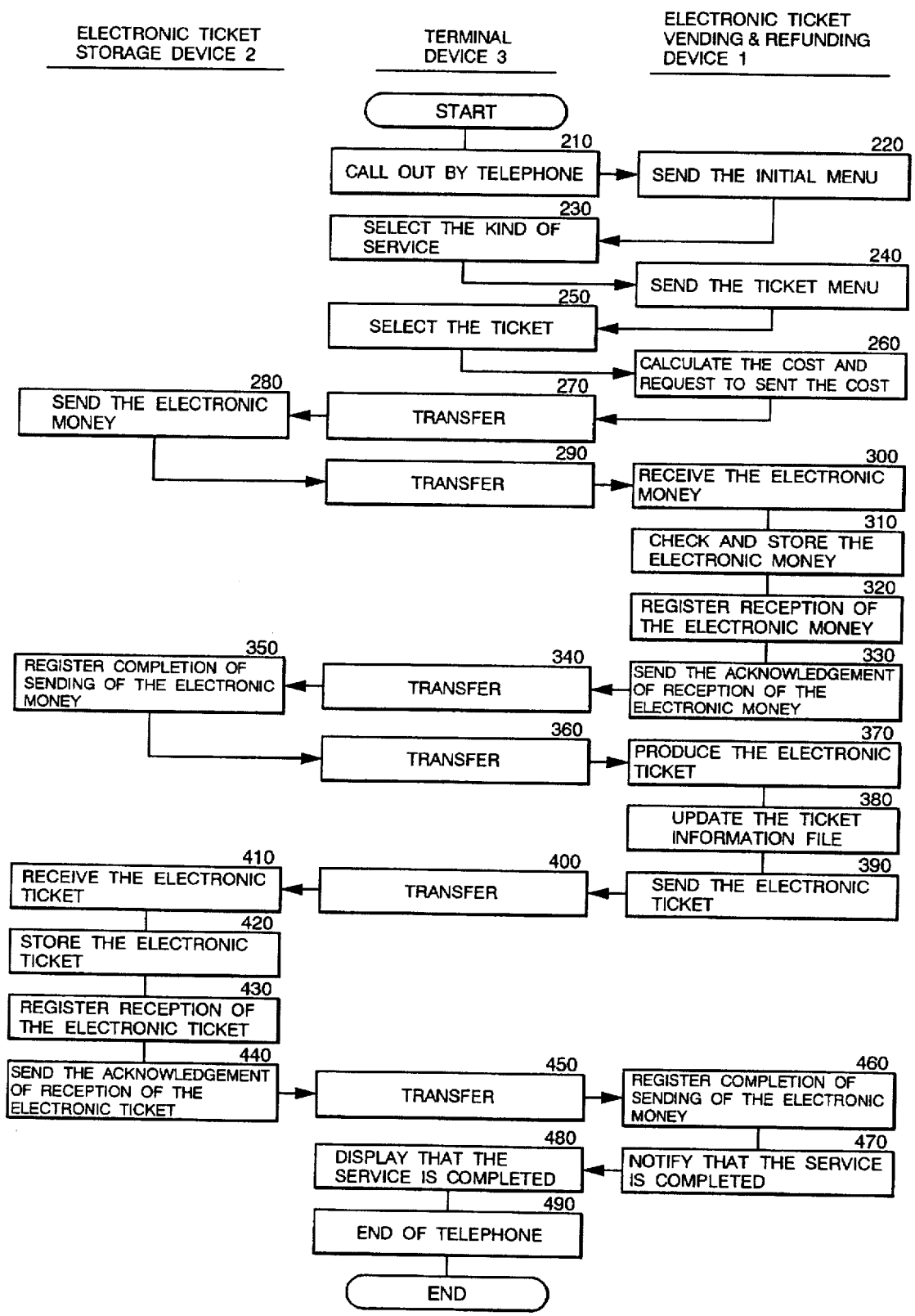
FIG. 5 is a flow chart showing an embodiment of the processing procedure for purchasing an electronic ticket using the electronic ticket vending and refunding system shown in FIG. 1.

FIG. 5 is a flow chart showing the outline of the processing procedure for purchasing an electronic ticket using the electronic ticket vending and refunding system shown in FIG. 1.

To purchase an electronic ticket, a ticket purchaser calls out the electronic ticket vending and refunding device 1 of a ticket publisher handling the ticket to be purchased by using the terminal device 3 (Step 210). When the electronic ticket vending and refunding device 1 is called out via the telephone line 4, it sends the initial menu via the telephone line 4 (Step 220). When the terminal device 3 receives the initial menu, the terminal device 3 displays it on the display device 23 and waits for input from the ticket purchaser.

Figure 6:
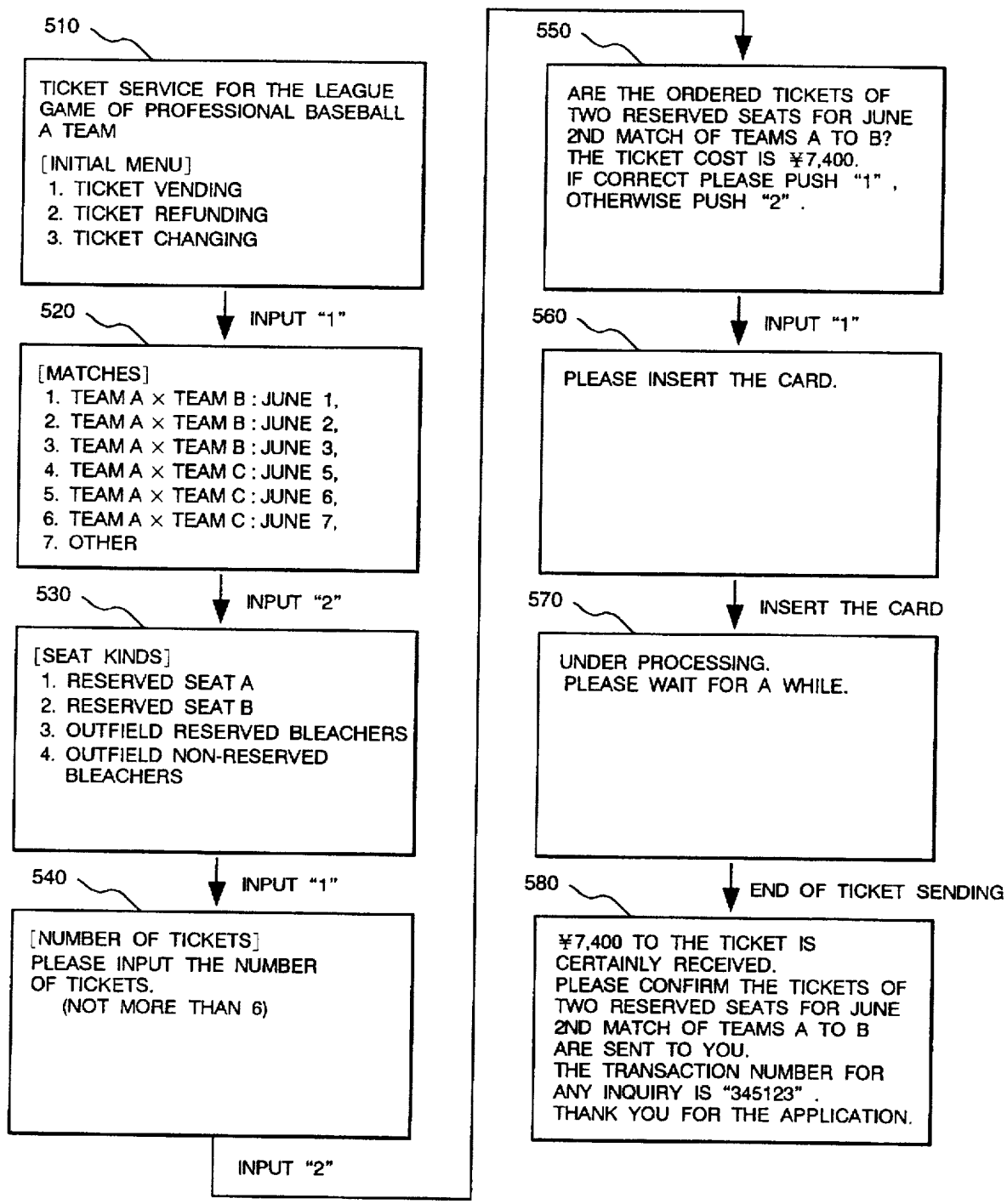
FIG. 6 is an illustration showing operation screen examples displayed on the display device of the terminal device shown in FIG. 3 according to the processing procedure for purchasing an electronic ticket.

FIG. 6 shows operation screen examples displayed on the display device 23 when a ticket is purchased. In FIG. 6, reference code 510 indicates an initial menu screen. When the ticket purchaser inputs "1" indicating ticket vending from the input device 22, the data is sent to the electronic ticket vending and refunding device 1 via the telephone line 4 (Step 230).

When the electronic ticket vending and refunding device 1 receives it, the electronic ticket vending and refunding device 1 sends a ticket menu screen 520 showing the content of the game (competitor team, match date, etc.) to the terminal device 3 via the telephone line. If the ticket purchaser looks at the ticket menu and purchases, for example, a ticket for the June 2nd match of teams A to B, when "2" is inputted, the input is informed of the electronic ticket vending and refunding device 1 via the telephone line. In the same way hereinafter, when "1" indicating reserved seat A is inputted for a screen 530 showing seat kinds and for example, 2 tickets are to be purchased for a screen 540 showing the number of tickets, "2" is inputted. As a result, the electronic ticket vending and refunding device 1 checks whether the ticket requested by the ticket purchaser can be vended and when it can be vended, the electronic ticket vending and refunding device 1 calculates the ticket cost and sends the result to the terminal device 3. The terminal device 3 displays the received content (the content of the purchased ticket, the number of tickets, cost, confirmation thereof, etc.) on a screen 550 and when the ticket purchaser inputs "1", the terminal device 3 sends it to the electronic ticket vending and refunding device 1. When the ticket cannot be vended, the electronic ticket vending and refunding device 1 sends that effect to the terminal device 3 and asks the ticket purchaser if he will purchase another ticket. When the ticket purchaser wants to purchase another ticket, the terminal device 3 displays the ticket menu screen 520 showing the game content again. In this case, the electronic ticket vending and refunding device 1 may ask the ticket purchaser the screen to be displayed (Steps 240, 250).

When the electronic ticket vending and refunding device 1 receives it, the device presses the terminal device 3 to insert the electronic ticket storage device (IC card) 2 into the terminal device 3 (screen 560). When the electronic ticket storage device 2 is a non-contact IC card, it is desirable to bring the electronic ticket storage device 2 close to the terminal device 3. When the ticket purchaser inserts the electronic ticket storage device 2 into the IC card R/W 26 of the terminal device 3, the terminal device 3 informs the electronic ticket vending and refunding device 1 that the electronic ticket storage device 2 is inserted. The electronic ticket vending and refunding device 1 sends a request command for sending a ticket cost of 7400 yen to the electronic ticket storage device 2 via the terminal device 3 (Step 260). When the processing procedure from Step 260 to Step 470 is in execution hereafter, the display device 23 of the terminal device 3 displays "Under Processing" like a screen 570 shown in FIG. 6.

In this case, as an encryption method for sending electronic money, the method used for sending between electronic purses which is disclosed in Published Unexamined Patent Application 5-504643 described in the conventional example is used. This method will be explained briefly hereunder. In the method, an asymmetric encryption algorithm represented by the RSA system is used. Each electronic purse retains a global public key Pg which is shared by all the electronic purses, a local secret key Sli which is intrinsic to each electronic purse, a local public key Pli, and Pli*Sg which is obtained by encrypting the local public key Pli by a global secret key Sg. A symbol * indicates encryption or decryption, and the preceding of the symbol * indicates data to be encrypted or decrypted, and the subsequent of the symbol * indicates a key used for encryption or decryption. Assuming the local secret key of the electronic purse on the sending side as Sls and the local public key thereof as Pls and the local secret key of the electronic purse on the receiving side as Slr and the local public key thereof as Plr, the electronic purse on the receiving side sends Plr*Sg+R*Slr to the electronic purse on the sending side. A symbol R indicates a message on the receiving side including transaction identification, transaction sequence number, and data (data of an amount of money since money is sent in this example). When the electronic purse on the sending side receives it, the electronic purse on the sending side acquires the local public key Plr using the global public key Pg retained by the electronic purse on the sending side and acquires the message R on the receiving side including transaction identification, transaction sequence number, and data of an amount of money using the local public key Plr. The electronic purse on the sending side acquires the data of an amount of money to be sent from the message R and subtracts the amount of money from the electronic money stored in the storage unit of the electronic purse on the sending side. Next, the electronic purse on the sending side produces a message VR on the sending side which includes the amount of money to be sent, the transaction identification, and the message R and then sends Pls*Sg+VR*Sls to the electronic purse on the receiving side. The electronic purse on the receiving side acquires the local public key Pls on the sending side using the global public key Pg retained by itself, acquires the message VR on the sending side using the local public key Pls, checks whether the message R sent by itself is included in the message VR, and when it is valid, increases the electronic money stored in the storage unit of the electronic purse on the receiving side by the amount of money included in the message VR. Finally, the electronic purse on the receiving side informs the electronic purse on the sending side that the process ends normally. By this series of steps, electronic money is sent or received between the electronic purses safely.

The explanation will be restarted by referring to FIGS. 5 and 6 again. Assuming that the electronic purse on the receiving side is the electronic ticket vending and refunding device 1 and the electronic purse on the sending side is the electronic ticket storage device 2, a ticket cost of 7400 yen can be sent to the electronic ticket vending and refunding device 1 from the electronic ticket storage device 2 safely according to the sending procedure of the aforementioned conventional example. The electronic ticket storage device 2 receives data sent from the electronic ticket vending and refunding device 1 from the external I/O interface 37 via the IC card R/W of the terminal device 3 (Step 270), decrypts the sent data, subtracts the sent request amount of money from the amount of electronic money in the electronic money storage area 33, encrypts the amount of money, and then sends it to the electronic ticket vending and refunding device 1 (Step 280).

When the electronic ticket vending and refunding device 1 receives the electronic money of 7400 yen from the electronic ticket storage device 2 (Step 300), it checks for the validity of the received electronic money, accumulates 7400 yen in the electronic ticket storage area 12 (Step 310), and registers, for example, "Transaction No. 345123, 7400 yen is received" in the transaction history file 17 (Step 320). FIG. 7 shows an example of the content of the transaction history file 17 of the electronic ticket vending and refunding device 1. Transaction history data 650 of the transaction history file 17 comprises "transaction #" data indicating the transaction sequence number, "object" data indicating money or a ticket, "sent/received" data indicating whether an object is sent or received, "content" data indicating the amount of money or the content of a the transaction history can be deleted or not.

Next, the electronic ticket vending and refunding device 1 sends a notification of acknowledgment of reception of electronic money (Step 330). When the CPU 38 of the electronic ticket storage device 2 receives the notification of reception of electronic money from the electronic ticket vending and refunding device 1 via the terminal device 3 (Step 340), the CPU 38 registers "7400 yen is sent for professional baseball A" in the transaction history storage area 35. Professional baseball A is ID of the electronic ticket vending and refunding device 1 (Step 350). FIG. 8 shows the content of the transaction history storage area 35. Transaction history storage data 630 in the transaction history storage area 35 comprises ID of an opposite of communication, "object" data indicating money or a ticket, "sent/received" data indicating whether an object is sent or received, "content" data indicating the amount of money or the content of a ticket, and "deletable flag" data indicating whether the transaction history can be deleted or not.

Next, the electronic ticket vending and refunding device 1 produces ticket information data 610 comprising a ticket publication source, an event name, a day and time, a place name, a seat number, and a serial number (Step 370) and updates the ticket information file 16 (Step 380). FIG. 9 shows a configuration example of the ticket information data 610 registered in the ticket information file 16.

It is necessary that a ticket publisher signs the ticket information data 610 electronically for prevention of forgery. As a method for electronic signature, an asymmetrical encryption algorithm is used. Each ticket publisher retains a secret key STk which varies with a ticket publisher and a public key PTk corresponding to it. For electronic signature, the whole or a part of the ticket information data 610 is encrypted by the secret key STk beforehand. To produce an electronic signature using a part of the ticket information data 610, it is desirable to acquire a part of the original data using the hash function and then encrypt STk. In the electronic ticket storage area 32 of the electronic ticket storage device 2, the ticket information data 610 and the electronic signature are stored. The constitution of ticket storage data 620 in the electronic ticket storage area 32 is shown in FIG. 10. The ticket storage data 620 comprises a ticket number, an unencrypted ticket information data 610, an electronic signature, and an invalid flag. As an alternative idea, like ticket storage data 640 having the constitution shown in FIG. 11, it is possible to store data which is obtained by encrypting the whole of the ticket information data 610 by the secret key STk and a public key PTk which forms a counterpart to the secret key STk in the electronic ticket storage area 32.

Hereinafter, in the case of the ticket data shown in FIG. 10, a combination of the ticket information data 610 and an electronic signature is called an electronic ticket and in the case of the ticket data shown in FIG. 11, the ticket information data 610 which is encrypted entirely and signed electronically is called an electronic ticket.

To judge the validity of an electronic ticket, when the electronic ticket has the constitution shown in FIG. 10, it is desirable to compare data in which the electronic signature is decrypted by using the public key PTk and the ticket information data 610 so as to check for identification. To produce an electronic signature using a part of the ticket information data 610, it is desirable to compare data in which the electronic signature is decrypted by the public key PTk and data which is obtained by extracting a part of the ticket information data 610 by using the same hash function as that used when the electronic signature is produced so as to check for identification.

When an electronic ticket has the constitution shown in FIG. 11, the electronic ticket is decrypted by using a public key PTk which forms a counterpart to a secret key STk retained by a device for deciding the validity and the validity is judged depending on whether the resultant data can be interpreted by the electronic ticket vending and refunding device 1 or not. As to whether interpretable or not, when the data decrypted by the electronic ticket vending and refunding device 1 is removed in the predetermined format, and the data removed by the electronic ticket vending and refunding device 1 is collated with the data which is retained beforehand, and a match is found, the data is interpretable. When no match is found, the data is uninterpretable. The public key PTk retained by the electronic ticket storage device 2 is used only for decrypting encrypted ticket information data by the electronic ticket storage device 2 when the content of an electronic ticket is confirmed by the terminal device 3 having no encryption mechanism. In this embodiment, the electronic ticket vending and refunding device 1 encrypts the whole or a part of the ticket information data 610 using the secret key ST1 (k=1 in this embodiment) and produces an electronic signature.

Next, in the same communication procedure as that of sending of electronic money, the communication content is encrypted and the electronic ticket is sent to the electronic ticket storage device 2 (Step 390). In this case, the secret key and public key to be used for encryption may be or may not be the same as those used for electronic money. In this embodiment, the global secret key for the electronic ticket storage devices 2 is STg, and the global public key is PTg, and the local secret key ST1i which varies with each electronic ticket storage device 2 is ST1i, and the local public key is PT1i and each ticket storage device 2 retains ST1i, PT1i, PTg, and PT1i*STg. The host computer of the ticket publisher, that is, the electronic ticket vending and refunding device 1 retains ST1i, PT1i, PTg, PT1i*STg, and STi. The global secret key STg is managed under strict management of a generalizing manager of the electronic ticket system. A generalizing system manager is a manager of the ticket vending and refunding network system and a supplier of an IC card (electronic ticket storage device 2) and software for the host computer (electronic ticket vending and refunding device 1) and the manager manages the global secret key of the encryption algorithm which is used by a user of the network for communication. A ticket vender receives the ticket vending and refunding software for host computer from the network system manager and a ticket purchaser receives an IC card from the network system manager. When the electronic ticket key is the same as the electronic money key, it is desirable to set STg=Sg, PTg=Pg, ST1i=S1i, and PT1i=Pli. In the electronic ticket vending and refunding device 1 in this embodiment, i=1 and in the electronic ticket storage device 2, i=2.

The communication procedure between the electronic ticket storage device 2 and the electronic ticket vending and refunding device 1 will be explained hereunder for the two cases which are divided depending on the form of an electronic ticket.

(a) When an electronic ticket comprises unencrypted ticket information data and an electronic signature.

The electronic ticket vending and refunding device 1 sends an electronic ticket reception preparation command to the electronic ticket storage device 2. Upon receipt of it, the electronic ticket storage device 2 sends PT12*STg+R*ST12 as an electronic ticket sending request via the telephone line 4. In this case, the message R includes transaction identification, transaction sequence number, and ticket data. The electronic ticket vending and refunding device 1 acquires the local public key PT12 using the retained global public key PTg and acquires the message R using the public key PT12. The electronic ticket vending and refunding device 1 produces a message VR including R from the ticket information data, the electronic signature, and the message R and then sends encrypted data of PT11*STg+VR*ST11 to the terminal device 3. The terminal device 3 which receives it via the telephone line transfers PT11*STg+VR*ST11 to the electronic ticket storage device 2 via the IC card R/W 26. The electronic ticket storage device 2 acquires the encrypted data of PT11*STg+VR*ST11 via the external I/O interface 37 and the microprocessor 38 decrypts the acquired encrypted data by the following procedure.

Firstly, the microprocessor 38 acquires the local public key PT11 using the global public key PTg and acquires the message VR using the local public key PR11. The microprocessor 38 acquires the message R, the ticket information data 610, and the electronic signature from the message VR and checks the validity of R by checking whether the message R which is sent from the electronic ticket storage device 2 before is included or not, and then stores the ticket information data 610 and the electronic signature in the electronic ticket storage area 32. When the electronic ticket storage area 32 can store a plurality of electronic tickets, the electronic ticket storage area 32 identifies the area storing the electronic tickets by the number thereof and stores the electronic tickets in the storage area of the number (1 in this case). The electronic ticket storage area 32 may store only one electronic ticket and in this case, there is no need to identify the electronic ticket by the aforementioned number.

The next processing procedure of Step 390 mentioned above will be explained by referring to FIGS. 5 and 6 again.

When the electronic ticket storage device 2 receives the electronic ticket (Step 410) via the terminal device 3 (Step 400) and stores the electronic ticket in the electronic ticket storage area 32 (Step 420), the electronic ticket storage device 2 registers "#1 electronic ticket is received from professional baseball A" in the transaction history storage area 35 (Step 430) and then notifies the electronic ticket vending and refunding device 1 of acknowledgment of reception of the electronic ticket (Step 440). When there exists only one electronic ticket storage area 32, it is possible to register the area number where the electronic ticket is stored or not.

When the electronic ticket vending and refunding device 1 receives the acknowledgment of reception (Step 460) via the terminal device 3 (Step 450), the electronic ticket vending and refunding device 1 registers "two tickets (2-56, 2-57) of reserved seats A for June 2nd match (6/2) for transaction #345123 are published" in the transaction history file 17 as shown in the transaction history data 650 in FIG. 7. In this case, transaction #345123 may be a ticket publication serial number.

The electronic ticket vending and refunding device 1 sends a notification of service completion to the terminal device 3 (Step 470), and the terminal device 3 displays it on the display device 23 (screen 580) (Step 480), and then the communication is completed (Step 490).

(b) When an electronic ticket comprises only data in which the whole of the ticket information data is encrypted and signed electronically In the same way as with the data constitution in (a), the electronic ticket vending and refunding device 1 sends an electronic ticket reception preparation command to the electronic ticket storage device 2 and upon receipt of it, the electronic ticket storage device 2 sends encrypted data of PT12*STg+R*ST12 to the electronic ticket vending and refunding device 1 via the telephone line 4. The electronic ticket vending and refunding device 1 acquires the message R from the aforementioned encrypted data and then produces a message VR including R from the electronic ticket which is produced by encrypting the whole of the ticket information data by the secret key ST1, the message R, and the public key PT1 which forms a counterpart to the secret key ST1 and sends encrypted data of PT11*STg+VR*PT11 to the electronic ticket storage device 2 (Step 390). When the electronic storage device 2 receives the encrypted data (Step 410) via the terminal device 3 (Step 400), the CPU 38 acquires the message VR from the encrypted data in the same procedure as that in (a), acquires the message R, the electronic ticket encrypted by the secret key ST1, and the electronic signature from this acquired message VR, checks the validity of R by checking whether R which is sent from the electronic ticket storage device 2 before is included or not, and then stores the acquired encrypted electronic ticket data and the public key PT1 in the electronic ticket storage area 32 as the ticket storage data 640 as shown in FIG. 11 (Step 420). In the same way as with the case in (a), the electronic ticket storage area 32 may store only one electronic ticket or a plurality of electronic tickets.

When the storing process into the electronic ticket storage area 32 is completed normally in the same way as with the case in (a), the electronic ticket storage device 2 registers "#1 electronic ticket is received from professional baseball A" in the transaction history storage area 35 (Step 430) and then sends acknowledgment of reception to the electronic ticket vending and refunding device 1 (Step 440). When the electronic ticket vending and refunding device 1 receives the acknowledgment of reception via the terminal device 3 (Step 450), the electronic ticket vending and refunding device 1 registers "two tickets (2-56, 2-57) of reserved seats A for June 2nd match (6/2) for transaction #345123 are published" in the transaction history file 17 (Step 460).

The electronic ticket vending and refunding device 1 sends a notification of service completion to the terminal device 3 (Step 470), and the terminal device 3 displays it on the display device 23 (screen 580) (Step 480), and then the communication is completed (Step 490).

As mentioned above, by using a telephone line, a ticket purchaser can purchase a ticket without going to a ticket stall. Since data between devices is encrypted, even if data flowing the telephone line is intercepted, the electronic ticket will not be forged or illegally reproduced. Furthermore, if the transaction history of an electronic ticket and electronic money is stored, a trouble on transmission and reception of the electronic money and electronic ticket can be prevented. In this embodiment, by using a microprocessor (CPU) in which a program is set so that an electronic ticket and electronic money are mounted in one device (IC chip) and the transaction history when the electronic ticket and electronic money are actually sent or received and the transaction history which is applicable only after the electronic ticket is deleted are updated, the transaction history can be prevented from alteration.

(2) Case of refunding a purchased ticket

Figure 12:
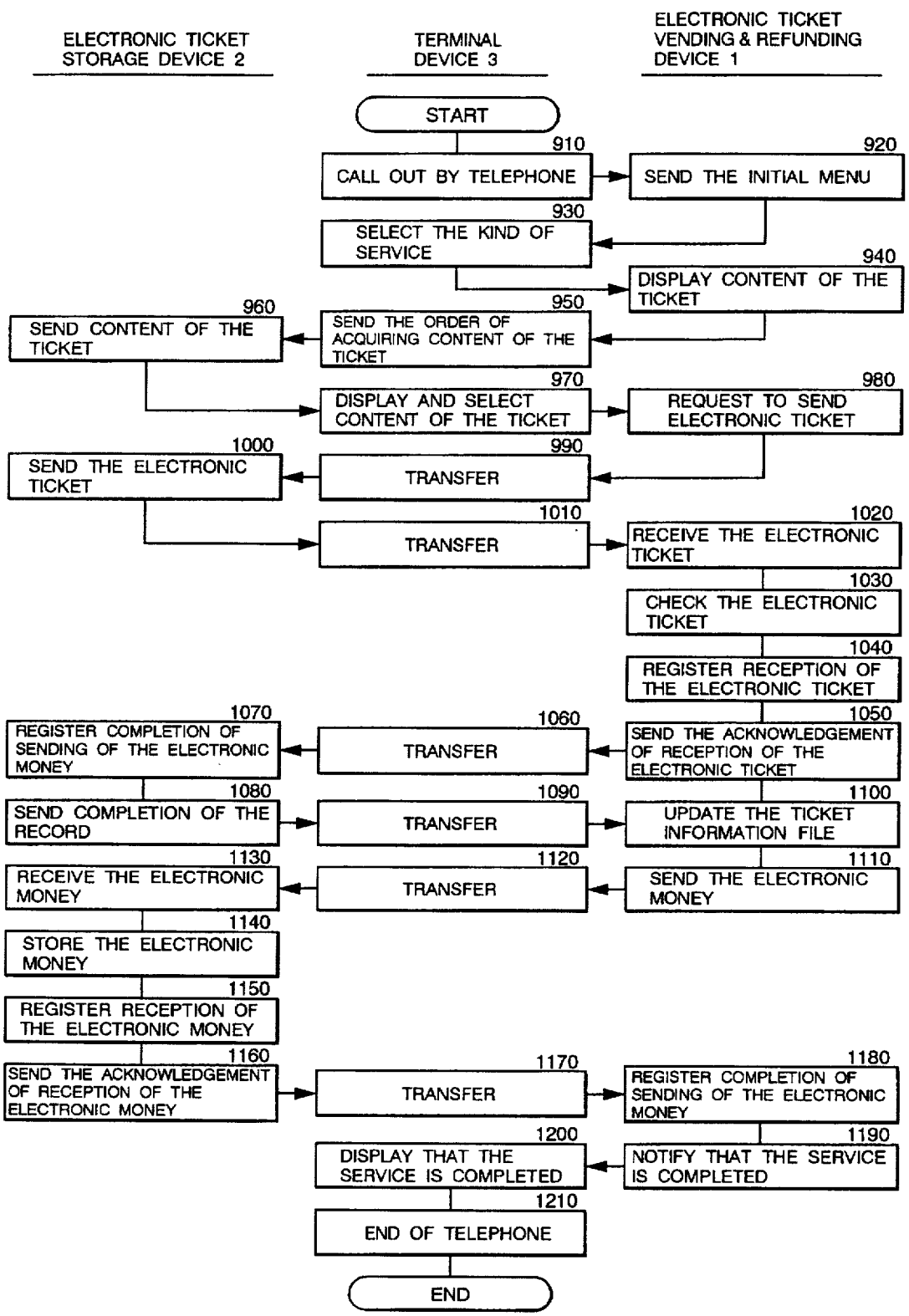
FIG. 12 is a flow chart showing an embodiment of the processing procedure for refunding an electronic ticket using the electronic ticket vending and refunding system of the present invention.
Figure 13:
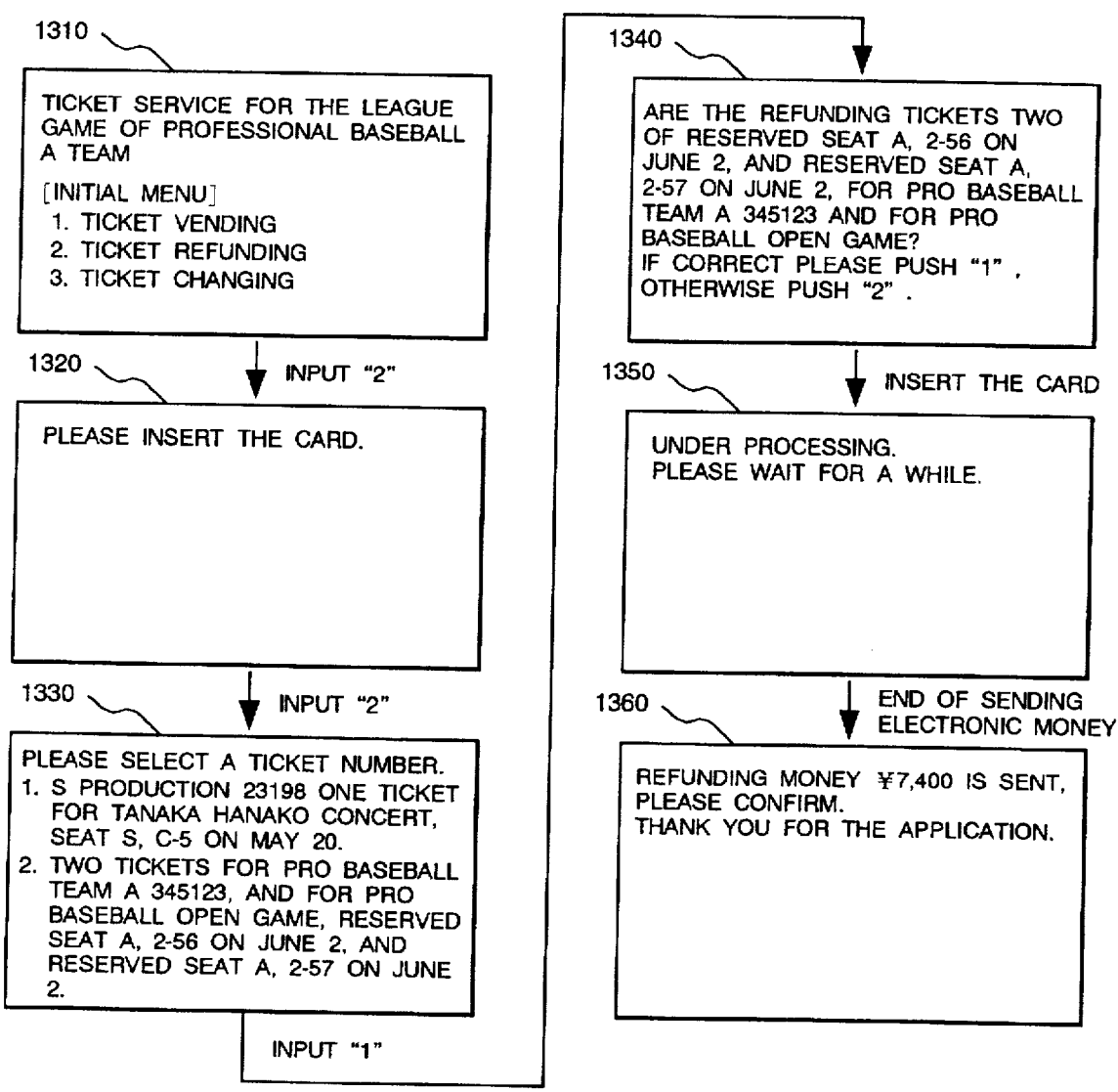
FIG. 13 is an illustration showing operation screen examples displayed on the display device of the terminal device shown in FIG. 3 according to the processing procedure for refunding an electronic ticket.

FIG. 12 is a flow chart showing the outline of the processing procedure for refunding a purchased electronic ticket using the electronic ticket vending and refunding system shown in FIG. 1 and FIG. 13 is an illustration showing operation screen examples displayed on the display device 23 of the terminal device 3 for refunding an electronic ticket.

Firstly, a ticket purchaser calls out the electronic ticket vending and refunding device 1 of a ticket publisher or a ticket vender of the ticket to be refunded by using the terminal device 3 (Step 910). The electronic ticket vending and refunding device 1 sends the initial menu to the terminal device 3 via the telephone line 4 (Step 920) and the terminal device 3 displays an initial menu 1310 on the display device 23.

When the ticket purchaser inputs "2" equivalent to ticket refunding using the input device 22 according to the initial menu, the terminal device 3 sends "2" to the electronic ticket vending and refunding device 1 via the telephone line 4 (Step 930). The electronic ticket vending and refunding device 1 sends data corresponding to a screen 1320 to the terminal device 3 and the terminal device 3 displays the screen 1320 on the display device 23 and instructs the ticket purchaser to insert the IC card, that is, the electronic ticket storage device 2.

When the ticket purchaser inserts the electronic ticket storage device 2 in which the electronic ticket to be refunded is stored, the terminal device 3 sends to the electronic ticket vending and refunding device 1 that the electronic ticket storage device 2 is inserted. The electronic ticket vending and refunding device 1 sends a command to the terminal device 3 so as to read the ticket information data from the electronic ticket storage device 2 and display the ticket content on the display device 23 (Step 940). The terminal device 3 reads the ticket information data from the electronic ticket storage device 2 (Steps 950, 960) and displays the ticket information data on the display device 23. The terminal device 3 may display a plurality of ticket information data at a time according to the size of the display device 23 or may display one by one. Furthermore, in this case, the electronic ticket vending and refunding device 1 may command the terminal device 3 so that the terminal device 3 sends read ticket information data to the electronic ticket vending and refunding device 1 one by one and the electronic ticket vending and refunding device 1 displays it or may control so that the CPU 27 of the terminal device 3 displays read data.

A case that the CPU 27 displays all stored ticket information data on one screen will be explained hereunder.

When the terminal device 3 displays the ticket information stored in the electronic ticket storage device 2 as shown on a screen 1330 and then the ticket purchaser inputs the ticket number (1 in this example) to be refunded from the ticket screen shown on the screen 1330, the terminal device 3 sends "1" to the electronic ticket vending and refunding device 1 (Step 970). When the electronic ticket vending and refunding device 1 receives "1", the electronic ticket vending and refunding device 1 sends a sending request command for the electronic ticket of Item No. 1 to the electronic ticket storage device 2 via the terminal device 3 (Steps 980, 990).

The communication procedure between the electronic ticket storage device 2 and the electronic ticket vending and refunding device 1 will be explained hereunder for the two cases which are divided depending on the form of an electronic ticket.

(a) When an electronic ticket comprises unencrypted ticket information data and an electronic signature In the same way as with the case of purchasing a ticket newly in (1) mentioned above, the electronic ticket storage device 2 retains the global public key PTg, the local secret key ST12, the local public key PT12, and PT12*STg which is obtained by signing (encrypting) the local public key PT12 by the global secret key STg and the electronic ticket vending and refunding device 1 retains the global public key PTg, the local secret key ST11, the local public key PT11, PT11*STg which is obtained by signing (encrypting) the local public key PT11 by the global secret key STg, and the global secret key STg for electronic ticket.

Firstly, the electronic ticket vending and refunding device 1 sends encrypted data of PT11*STg+R*ST11 to the electronic ticket storage device 2 via the telephone line 4. In this case, the message R includes transaction identification, transaction sequence number, and ticket data. The CPU 38 of the electronic ticket storage device 2 acquires unencrypted ticket information data and en electronic signature from the area of Item No. 1 of the electronic ticket storage area 32.

Next, the CPU 38 produces a message VR from the message R, the ticket information, and the electronic signature and sends encrypted data of PT12*STg+VR*ST12 to the electronic ticket vending and refunding device 1 via the telephone line 4 (Step 1000). When there is an invalid flag in the electronic ticket storage area 32, the invalid flag is turned ON. The reason that the invalid flag is turned ON without deleting the data is that the data which is stored originally is prevented from becoming indefinite due to a communication failure before the refunding is completed and at the same time, a status that the electronic ticket storage device 2 is forcibly pulled out immediately after the refunding is completed and both the valid ticket and the refund exist in the electronic ticket storage device 2 is prevented.

When the electronic ticket vending and refunding device 1 receives this encrypted data via the terminal device 3 (Steps 1010, 1020), the electronic ticket vending and refunding device 1 acquires the unencrypted ticket information data, the electronic signature, and the message R from the message VR, verifies the validity of the message R by confirming whether R which is sent by the electronic ticket vending and refunding device 1 before is included, and then verifies the validity of the electronic signature (Step 1030). The validity of the electronic signature is verified by decrypting the electronic signature by the public key PT1 retained by the electronic ticket vending and refunding device 1 and comparing the identity with the ticket information data. When the electronic signature is produced from a part of the ticket information data, it is desirable to extract a part of the ticket information data received by the same procedure (for example, the same hash function) as that for producing the electronic signature and compare it with the electronic signature which is decrypted before.

When the confirmation of the validity is completed, the electronic ticket vending and refunding device 1 registers reception of the electronic ticket in the transaction history file (Step 1040). FIG. 14 shows transaction history data 1370 which is an example of the content of the transaction history file 17 of the electronic ticket vending and refunding device 1. When the electronic ticket is received, the ticket is refunded, so that the deletable flag corresponding to the transaction history of the transaction number concerned in vending and refunding of the ticket is changed to ON.

Thereafter, the electronic ticket vending and refunding device 1 sends acknowledgment of reception of the electronic ticket to the electronic ticket storage device 2 (Step 1050). When the electronic ticket storage device 2 receives the acknowledgment of reception via the terminal device 3 (Step 1060), the electronic ticket storage device 2 registers completion of sending of the ticket in the transaction history storage area 35 (Step 1070). FIG. 15 shows transaction history storage data 1380 which is an example of the content of the transaction history storage area 35 of the electronic ticket storage device 2.

When the registration is completed, the electronic ticket storage device 2 sends notification of completion to the electronic ticket vending and refunding device 1 (Step 1080). When the electronic ticket storage device 2 receives the completion of registration via the terminal device (Step 1090), the electronic ticket storage device 2 updates the ticket information file 16, registers that the corresponding ticket becomes revendible (Step 1100), subtracts the refund from the electronic money storage area 12, and then sends the electronic money equivalent to the refund to the electronic ticket storage device 2 (Step 1110).

When the refunding commission is required in this case, the electronic ticket storage device 2 calculates the refund in consideration of the amount of money. When the electronic ticket storage device 2 receives the electronic money (Step 1130) via the terminal device (Step 1120), the electronic ticket storage device 2 accumulates the amount of electronic money in the electronic money storage area 33 (Step 1140). The electronic ticket storage device 2 registers reception of the electronic money in the transaction history storage device 35 (Step 1150). When there exists a deletable flag area in the transaction history storage area 35, the deletable flag corresponding to the transaction history concerned in vending and purchasing of the refunded ticket is turned ON.

Thereafter, the electronic ticket storage device 2 sends acknowledgment of reception of the electronic ticket to (Step 1160). When the electronic ticket vending and refunding device 1 receives the acknowledgment of reception from the electronic ticket storage device 2 via the terminal device 3 (Step 1170), the electronic ticket vending and refunding device 1 registers completion of refunding in the transaction history file 17 (Step 1180). When there exists a deletable flag area, the deletable flag corresponding to the transaction history concerned in vending and purchasing of the refunded ticket is turned ON.

Therefore, differences between the example of the transaction history data 1370 of the electronic ticket vending and refunding device 1 shown in FIG. 14 and the example of the transaction history data 650 shown in FIG. 7 are the respect that the deletable flag of the transaction history of the transaction number of the ticket and money to be refunded is changed to ON and the respect that the transaction history of the transaction number receiving the corresponding refunded ticket and the transaction history of the transaction number refunding the corresponding money are added. Differences between the example of the transaction history storage data 1380 of the electronic ticket storage device 2 shown in FIG. 15 and the example of the transaction history storage data 630 shown in FIG. 8 are the respect that the deletable flags of the corresponding money of the ID of the corresponding opposite of communication and the ticket transaction history are changed to ON respectively and the respect that the transaction history returning the corresponding ticket and the transaction history receiving the corresponding money are added.

Finally, the electronic ticket vending and refunding device 1 sends a notification of service completion to the terminal device 3 (Step 1190), and the terminal device 3 displays it on the display device 23 (screen 1360) (Step 1200), and the communication is completed (Step 1210).

(b) When an electronic ticket comprises only ticket information data which is wholly encrypted and electronically signed Firstly, the electronic ticket vending and refunding device 1 sends encrypted data of PT1l*STg+R*ST11 to the electronic ticket storage device 2 via the telephone line 4. In this case, the message R includes transaction identification, transaction sequence number, and ticket data. The CPU 38 of the electronic ticket storage device 2 acquires the ticket information data which is wholly encrypted by the secret key ST1 from the area of Item No. 1 of the electronic ticket storage area 32.

Next, the CPU 38 produces a message VR from the message R and the encrypted ticket information and sends encrypted data of PT12*STg+VR*ST12 to the electronic ticket vending and refunding device 1 via the telephone line 4 (Step 1000). When there is an invalid flag in the electronic ticket storage area 32, the invalid flag is turned ON. When the electronic ticket vending and refunding device 1 receives it via the terminal device 3 (Steps 1010, 1020), the electronic ticket vending and refunding device 1 acquires the encrypted ticket information data and the message R from the message VR, verifies the validity of the message R by confirming whether R which is sent by the electronic ticket vending and refunding device 1 before is included, and then verifies the validity of the encrypted ticket information data (Step 1030). The validity of the encrypted ticket information data is verified by decrypting the ticket information data which is encrypted by the public key PT1 retained by the electronic ticket vending and refunding device 1 and judging whether the decrypted data can be interpreted or not.

Hereafter, Step 1040 to Step 1210 are the same as the steps in (a) When an electronic ticket comprises unencrypted ticket information data and an electronic signature, so that the explanation thereof will be omitted.

When there exists no invalid flag in the electronic ticket storage area 32, another storage area (not shown in the drawing) for storing ticket information data to be sent is installed, and the ticket information data to be sent is copied in this storage area, and the corresponding ticket information data existing in the electronic ticket storage area is deleted, and then the copied ticket information data is sent, and when ticket information data having no electronic signature is to be sent, it is not copied in the aforementioned another storage area so that an occurrence of a status that there exist a plurality of tickets at the time of communication can prevented and the evidence can be perpetuated.

(3) Case of confirming the content of a purchased electronic ticket

Figure 16:
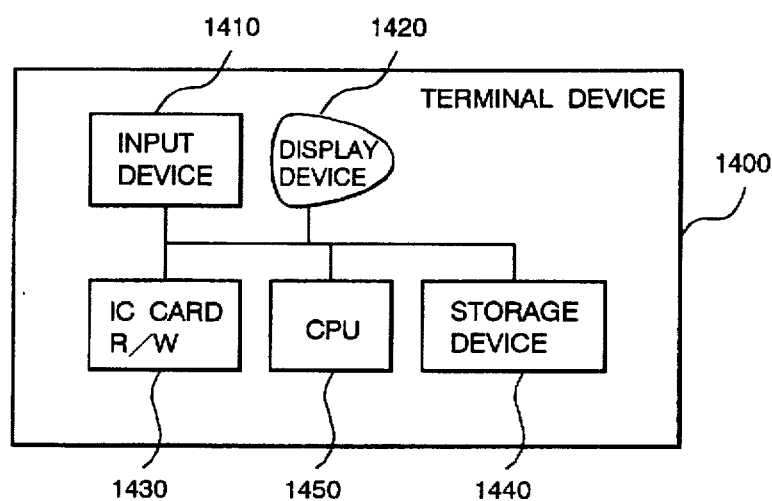
FIG. 16 is a block diagram showing another embodiment of a terminal device used in the electronic ticket vending and refunding system of the present invention.

A case that the content of an electronic ticket stored in the electronic ticket storage device 2 is confirmed by the terminal device 3 shown in FIG. 3 or a portable terminal device 1400 having the constitution shown in FIG. 16 will be explained hereunder. In this case, the terminal device 1400 is used for explanation. However, needless to say, the terminal device 3 or a similar device including the constitution elements of the terminal device 1400 may be used. The portable terminal device 1400 comprises, as shown in FIG. 16, an input device 1410 for inputting data, a display device 1420 for displaying data, an IC card R/W 1430 for communicating with the electronic ticket storage device 2 comprising an IC card, a storage device 1440, and a CPU 1450 for controlling the aforementioned devices 1410 to 1440.

The communication procedure between the electronic ticket storage device 2 and the electronic ticket vending and refunding device 1 will be briefly explained hereunder for the two cases which are divided depending on the form of an electronic ticket by referring to the screen examples shown in FIG. 17.

(a) When an electronic ticket comprises unencrypted ticket information data and an electronic signature When the power switch of the terminal device 1400 is turned on, a screen 1510 is displayed on the display device 1420. When a ticket purchaser inserts the electronic ticket storage device 2 into the IC card R/W 1430 of the terminal device 1410 and then selects "acknowledgment of electronic ticket content" by inputting "1" equivalent to "ticket content displayed" using the input device 1410, the terminal device 1400 sends a command for acquiring ticket information data to the electronic ticket storage device 2 via the IC card R/W 1430. The electronic ticket storage device 2 receives the command from the external I/O interface 37 and the CPU 38 acquires the ticket information data from the electronic ticket storage area 32 according to the command and sends the ticket information data to the terminal device 1400 via the external I/O interface 37. The terminal device 1400 displays the received ticket information data on the display device 1420, for example, as shown on a screen 1520.

When a plurality of electronic tickets are stored in the electronic ticket storage device 2, the terminal device 1400 may display the contents of all the electronic tickets according to the size of the display device 1420 or may display one by one. When the number at which an electronic ticket is stored is designated so as to send a ticket information data acquisition command, the control operation of the CPU 38 of the electronic ticket storage device 2 may be programmed so as to send only the electronic ticket data corresponding to the designated number to the terminal device 1400 or to send the ticket information data of all the electronic tickets to the terminal device 1400 when no specific number is designated.

If "acknowledgment of money balance" is selected by inputting "2" equivalent to "money balance displayed" using the screen input device 1410 when the screen 1510 is displayed on the display device 1420, in the same way as with "ticket content displayed", the terminal device 1400 sends a command for acquiring the electronic money balance data of the electronic money storage area 33 to the electronic ticket storage device 2 via the IC card R/W 1430. The terminal device 1400 displays the received electronic money balance data on the display device 1420, for example, as shown on a screen 1530.

Or, if "acknowledgment of transaction history" is selected by inputting "3" equivalent to "transaction history displayed" using the screen input device 1410 when the screen 1510 is displayed on the display device 1420, in the same way as with "ticket content displayed", the terminal device 1400 sends a command for acquiring the transaction history storage data of the transaction history storage area 35 to the electronic ticket storage device 2 via the IC card R/W 1430. The terminal device 1400 displays the received transaction history storage data on the display device 1420, for example, as shown on a screen 1540.

(b) When an electronic ticket comprises only ticket information data which is wholly encrypted and electronically signed A difference from the case of (a) mentioned above is that the CPU 38 of the electronic ticket storage device 2 acquires data in which the whole of an electronic ticket, that is, ticket information data is encrypted and the public key PT11 for decrypting encrypted ticket information data from the electronic ticket storage area 32, decrypts the electronic ticket using the acquired public key PT11, and then sends the data to the terminal device 1400.

As mentioned above, for the ticket information data acquisition command, the electronic ticket storage device 2 sends unencrypted ticket information data to the terminal device 1400, so that the encryption/decryption means is not necessary for the terminal device 1400. As a result, even a general portable terminal device can confirm the content of a ticket briefly and the security can be ensured at the same time because the encryption method is not known by a third person. Furthermore, the validity as an electronic ticket cannot be proved only by unencrypted ticket information data, that is, ticket information data which is not signed electronically, so that there is an advantage that the electronic ticket cannot be forged only by reproducing the ticket information data.

The suitable embodiments of the present invention have been explained above. However, needless to say, the present invention is not limited to the aforementioned embodiments and within a range which is not deviated from the concept of the present invention, the design can be changed variously.

As the aforementioned embodiments show, according to the present invention, since a ticket can be purchased or refunded using a communication means such as a telephone line, a ticket purchaser can purchase or refund a ticket at home without going to a ticket vending counter.

Since different ticket publishers can share a single electronic ticket system safely, a publisher can store different electronic tickets in one electronic ticket storage device.

Furthermore, by storing both electronic money and an electronic ticket in a single electronic ticket storage device and controlling sending and reception thereof and the sending and reception history thereof by the microprocessor of the electronic ticket storage device, a transaction history having a high evidence ability which cannot be altered easily can be realized.

Furthermore, it is possible to prevent a ticket purchaser from retaining both a valid ticket and a refund at the same time and when the ticket purchaser cannot receive the refund, it can be proved that he retains the ticket.

The invention claimed is:

1. An electronic ticket vending system comprising:

electronic ticket vending means for generating an electronic ticket and executing at least one of vending and refunding by exchanging the generated electronic ticket with electronic money;

a communication line connected to said vending means;

at least one terminal means connected to said communication line for executing input, output, transmission and reception for executing at least one of vending and refunding of an electronic ticket; and electronic ticket storage means having means for electronically connecting said terminal means for storing electronic money, means for storing an electronic ticket, and means for storing a transaction history including transactions of electronic money and electronic tickets, updated by a program stored in said electronic ticket storage means, at a transaction of at least one of electronic money and an electronic ticket;

wherein by a request of one of purchasing and refunding of an electronic ticket by at least one of said terminal means and said electronic ticket storage means, at least one of said electronic ticket and said electronic money is sent from said electronic ticket vending means via said communication line.

2. An electronic ticket vending system according to claim 1, wherein said electronic ticket vending means comprises:

ticket production means for producing a ticket;

ticket transmission and reception means for transmitting or receiving an electronic ticket;

money transmission and reception means for transmitting or receiving electronic money;

money storage means for storing electronic money;

transaction history storage means for storing a history, hereinafter referred to as a transaction history, of transmitting or receiving at least one of electronic money and an electronic ticket; and encryption key storage means for storing an encryption key.

3. An electronic ticket vending system according to claim 2, wherein said ticket production means comprises:

a microcomputer which has a program for producing an electronic ticket from at least data indicating a ticket publication source and data indicating the price of a ticket.

4. An electronic ticket vending system according to claim 2, wherein said electronic ticket vending means further comprises:

means for storing a secret key of an asymmetric encryption algorithm which varies with each ticket publisher and a public key forming a counterpart to said secret key.

5. An electronic ticket vending system according to claim 1, wherein said electronic ticket storage means further comprises:

an I/O interface as said means for electronically connecting said terminal means; and a microprocessor for controlling transmission and reception of an electronic ticket and electronic money, and storage of said transaction history.

6. An electronic ticket vending system according to claim 5, wherein said electronic ticket storage means further comprising:

means for storing unencrypted ticket data; and means for storing an electronic signature which is produced by encrypting the whole or a part of said ticket data by said secret key of the asymmetric algorithm;

wherein said microprocessor is set so as to return said unencrypted ticket information to a first command obtained via said I/O interface with the outside for reading said unencrypted ticket data as a response to said first command, check the validity of a second command for reading data having said electronic signature for said second command, and return said ticket information and said electronic signature as a response to said second command when said microprocessor judges that said second command is valid.

7. An electronic ticket vending system according to claim 5, wherein said electronic ticket storage means comprising:

means for storing ticket information which is encrypted by a secret key of an asymmetric encryption algorithm; and means for storing a public key which forms a counterpart to said secret key which encrypts said ticket information, wherein said microprocessor has a program for returning the result obtained by decrypting said encrypted ticket information by said public key, in response to a first command obtained via said I/O interface, checking the validity of a second command of reading data having said electronic signature for said second command, and returning said encrypted ticket information in response to said second command when said microprocessor judges that said second command is valid.

8. An electronic ticket vending system according to claim 6, wherein said microprocessor has a program for returning a response to the electronic signature which is sent together with said second command obtained via said I/O interface on whether there exists an electronic signature conforming to said electronic signature in said electronic ticket storage means.

9. An electronic ticket vending system according to claim 5, wherein said microprocessor has a program for protecting an item relating to said electronic ticket, until said electronic ticket stored in said electronic ticket storage means is deleted.

10. An electronic ticket vending system according to claim 5, wherein said microprocessor has a program for storing electronic money in said electronic money storage means in refunding of the ticket and for deleting the electronic ticket to be refunded after the storage, said electronic ticket being stored in an electronic ticket storage area of said electronic ticket storage means.

11. An electronic ticket vending system according to claim 5, wherein said electronic ticket storage means further has an area for storing an invalid flag and said microprocessor comprising:

mean for making said invalid flag corresponding to said electronic ticket to be refunded valid for refunding of the ticket and then transferring said electronic ticket to said electronic ticket vending means; and means for deleting said electronic ticket stored in said electronic ticket storage area of said electronic ticket storage means after completion of transfer.

12. An electronic ticket vending method in a system comprising electronic ticket transmission and reception means, at least one terminal means, and a communication line connecting said electronic ticket transmission and reception means and said at least one terminal means, said method comprising:

a step of sending a purchased electronic ticket to said electronic ticket transmission and reception means from at least one of the terminals connected to an electronic ticket storage means having means for electronically connecting to said terminal means, said electronic ticket storage means further having means for storing electronic money, an electronic ticket, and a transmission history including transactions of electronic money and electronic tickets, updated by a program stored in said electronic ticket storage means, at a transaction of at least one of electronic money and an electronic ticket;

a step of sending a sending request for the purchasing cost to the purchase desire terminal, when said electronic ticket can be vended from said electronic ticket transmission and reception means;

a step of sending the electronic money of said purchase cost to said electronic ticket transmission and reception means from said purchase desired terminal via said communication line;

a step of sending said purchase desired electronic ticket to said purchase desired terminal from said electronic ticket transmission and reception means after said electronic money is received; and a step of receiving said sent electronic ticket on said terminal and storing it in said electronic ticket storage means connected to said terminal.

13. An electronic ticket vending method according to claim 12, wherein when said purchased electronic ticket is to be refunded, said method further comprising:

a step of sending a refunding request to said electronic ticket transmission and reception means from said terminal via said communication lines;

a step of requesting sending of electronic ticket to be refunded, to the electronic ticket storage means connected to said terminal;

a step of receiving said electronic ticket sent from said electronic ticket storage means via said communication line, and then confirming the validity of said electronic ticket to be refunded;

a step of sending electronic money of said ticket to be refunded to said terminal via said communication line when said electronic ticket transmission and reception means judges that said electronic ticket to be refunded is valid as a result of the confirmation stated in the receiving step; and a step of transferring said electronic money to said electronic ticket storage means from said terminal receiving said electronic money.

14. An electronic ticket refunding method in a system comprising electronic ticket transmission and reception means, at least one terminal means, and a communication line connecting said electronic ticket transmission and reception means, said method comprising:

a step of sending an electronic ticket refunding request to said electronic ticket transmission and reception means from at least one of the terminals connected to an electronic ticket storage means having means for electronically connecting to said terminal means, said electronic ticket storage means further having means for storing electronic money, an electronic ticket, and a transmission history including transactions of electronic money and electronic tickets, updated by a program stored in said electronic ticket storage means, at a transaction of at least one of electronic money and an electronic ticket;

a step of requesting sending of said electronic ticket requested to be returned to the electronic ticket storage means connected to said terminal from said electronic ticket transmission and reception means;

a step of receiving said electronic ticket from said electronic ticket storage means via said communication line and then confirming the validity of the received electronic ticket by said electronic ticket transmission and reception means;

a step of sending electronic money of the ticket to be refunded to said terminal via said communication line when said electronic ticket transmission and reception means judges that said electronic ticket is valid as a result of said confirmation stated in the receiving step; and a step of transferring said electronic money to said electronic ticket storage means from said terminal receiving said electronic money.

15. An electronic ticket vending method according to claim 12, further comprising:

a step of receiving said electronic money from said electronic ticket storage means by said electronic transmission and reception means;

a step of storing that said electronic money is received from said electronic ticket storage means;

a step of sending said electronic ticket to said electronic ticket storage means; and a step of storing that said electronic ticket is sent to said electronic ticket storage means.

16. An electronic ticket vending method according to claim 13, further comprising:

a step of receiving said electronic ticket to be refunded, from said electronic ticket storage means by said electronic ticket transmission and reception means;

a step of storing said electronic ticket to be refunded is received from said electronic ticket storage means;

a step of sending said electronic money to said electronic ticket storage means; and a step of storing said electronic money is sent to said electronic ticket storage means.

17. An electronic ticket vending method according to claim 12, further comprising:

a step of sending said electronic money to said electronic ticket transmission and reception means from said terminal;

a step of storing said electronic money is sent to said electronic ticket transmission and reception means;

a step of receiving said electronic ticket by said terminal; and a step of storing said terminal receives said electronic ticket.

18. An electronic ticket vending method according to claim 13, further comprising:

a step of sending said electronic ticket to be refunded to said electronic ticket transmission and reception means from said electronic ticket storage means;

a step of storing said electronic ticket to be refunded is sent;

a step of receiving said electronic money from said electronic ticket transmission and reception means by said electronic ticket storage means; and a step of storing said electronic ticket storage means receives said electronic money.

* * * * *

Adverse Decision in Interference

Patent No. 5,754,654, Masaaki Hiroya, Hiroshi Asao, ELECTRONIC TICKET VENDING SYSTEM AND METHOD THEREOF, Interference No. 105,355, final judgment adverse to the patentees rendered July 19, 2006, as to claims 1-4 and 12-18.

(*Official Gazette* June 12, 2007)

UNITED STATES PATENT AND TRADEMARK OFFICE
CERTIFICATE OF CORRECTION

PATENT NO. : 5,754,654                             Page 1 of 1
APPLICATION NO. : 08/558741
DATED           : May 19, 1998
INVENTOR(S)     : Masaaki Hiroya et al.

It is certified that error appears in the above-identified patent and that said Letters Patent is hereby corrected as shown below:

Claim 6, column 25, line 40, should read:

--6. An electronic ticket vending system according to Claim 5, wherein said electronic ticket storage means further comprises:
  means for storing encrypted ticket data; and
  means for storing an electronic signature and produced by encrypting the whole or a part of said ticket data by a secret key of an asymmetric algorithm;
  wherein said microprocessor has a program for returning said encrypted ticket information in response to a first command obtained via said I/O interface for reading said encrypted ticket data, checking the validity of a second command for reading data having said electronic signature, and returning said ticket information with said electronic signature in response to said second command when said microprocessor judges that said second command is valid.--

Claim 11, column 26, line 32, delete "valid" and insert therefor --effective--.

Claim 11, column 26, line 37, before "transfer" insert --the--.

Claim 15, column 28, line 10, after "electronic" insert --ticket--.

Signed and Sealed this

Second Day of October, 2007

JON W. DUDAS
*Director of the United States Patent and Trademark Office*